(12) United States Patent
Ong

(10) Patent No.: US 11,785,506 B2
(45) Date of Patent: Oct. 10, 2023

(54) METHODS AND SYSTEMS FOR COMMUNICATION SESSION MANAGEMENT

(71) Applicant: Comcast Cable Communications, LLC, Philadelphia, PA (US)

(72) Inventor: Ivan Ong, Malvern, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 109 days.

(21) Appl. No.: 17/468,272

(22) Filed: Sep. 7, 2021

(65) Prior Publication Data

US 2023/0076077 A1    Mar. 9, 2023

(51) Int. Cl.
*H04W 28/22*    (2009.01)
*H04W 84/18*    (2009.01)
*H04W 24/02*    (2009.01)
*H04W 24/08*    (2009.01)
*H04W 72/54*    (2023.01)

(52) U.S. Cl.
CPC ........... *H04W 28/22* (2013.01); *H04W 24/02* (2013.01); *H04W 24/08* (2013.01); *H04W 72/54* (2023.01); *H04W 84/18* (2013.01)

(58) Field of Classification Search
CPC ..... H04W 28/22; H04W 24/02; H04W 24/08; H04W 72/54; H04W 84/18; H04W 4/70; H04L 5/00
See application file for complete search history.

(56) References Cited

U.S. PATENT DOCUMENTS

| 2017/0230811 A1* | 8/2017 | Wentink ................ H04W 76/14 |
| 2019/0059042 A1* | 2/2019 | Soundararajan ..... H04B 17/318 |
| 2021/0044511 A1* | 2/2021 | Connolly ................ H04L 43/50 |
| 2022/0240166 A1* | 7/2022 | Balaji ............... H04W 72/0446 |

FOREIGN PATENT DOCUMENTS

WO    2018/020397 A1    2/2018

* cited by examiner

*Primary Examiner* — Jae Y Lee
(74) *Attorney, Agent, or Firm* — Ballard Spahr LLP

(57) ABSTRACT

A computing device (e.g., a network device) may receive a request from a user device to initiate a communication session. The request may indicate a requested beacon data communication rate associated with the user device. The computing device may determine that an advertised beacon data communication rate associated with the computing device is different from the requested beacon data communication rate for the user device. The computing device may determine to communicate with the user device at the requested beacon data communication rate associated with the user device. The computing device may send, to the user device, a response at a data communication rate associated with the requested beacon data communication rate.

20 Claims, 7 Drawing Sheets

METHODS AND SYSTEMS FOR COMMUNICATION SESSION MANAGEMENT

BACKGROUND

Communication sessions between a network device and a user device may typically begin with an authentication and/or handshake process. To initiate the authentication and/or handshake process, the user device may seek to initially connect with a network device at the lowest common communication rate available. Some network devices may no longer support some lower (slower) communication rates, even for initiating the authentication and/or handshake process. However, some user devices may be limited to requesting these slower communication rates when initiating the authentication and/or handshake process, even when those user device may be able to communicate at faster rates once the communication session is established. This may prevent those user devices from being able to connect to network devices and other device implementing certain communication protocols.

SUMMARY

It is to be understood that both the following general description and the following detailed description are exemplary and explanatory only and are not restrictive. Methods and systems for communication session management are described.

A computing device (e.g., a user device), such as a client device, a personal computer, computing station, workstation, portable computer, laptop computer, mobile phone, tablet device, smartphone, smartwatch, activity tracker, smart apparel, smart accessory, security and/or monitoring device, a mobile device, a game system, a content output device, an IoT device, etc., may send a request (e.g., a probe request) that comprises a supported communication rate (e.g., a requested data communication rate, such as a requested beacon data communication rate) for the computing device in an effort to initiate an authentication and/or handshake process with a second computing device (e.g., a network device), such as a wireless router, gateway, access point, or node.

The second computing device may receive the request and compare the supported communication rates for the second computing device (e.g., an advertised beacon data communication rate) to the requested data communication rate of the computing device to determine if there is a common communication rate for initiating the authentication and/or handshake process. Based on a determination that the second computing device is unable to satisfy the requested data communication rate of the computing device, the second computing device may take one or more actions to successfully initiate the authentication, such as changing to a communication protocol that supports the requested data communication rate of the computing device, listing an unsupported data communication rate for the second computing device that satisfies (e.g., equals) the requested data communication rate but not actually communicating at the unsupported data communication rate, or adding a supported communication rate that satisfies (e.g., equals) the requested data communication rate for the computing device and communicating with the computing device at the requested data communication rate until a communication session is initiated between the computing device and the second computing device. The second computing device may then send a response (e.g., a probe response) to the computing device to continue the authentication process.

This summary is not intended to identify critical or essential features of the disclosure, but merely to summarize certain features and variations thereof. Other details and features will be described in the sections that follow.

BRIEF DESCRIPTION OF THE DRAWINGS

The accompanying drawings, which are incorporated in and constitute a part of the present description serve to explain the principles of the apparatuses and systems described herein.

DETAILED DESCRIPTION

Figure 1:
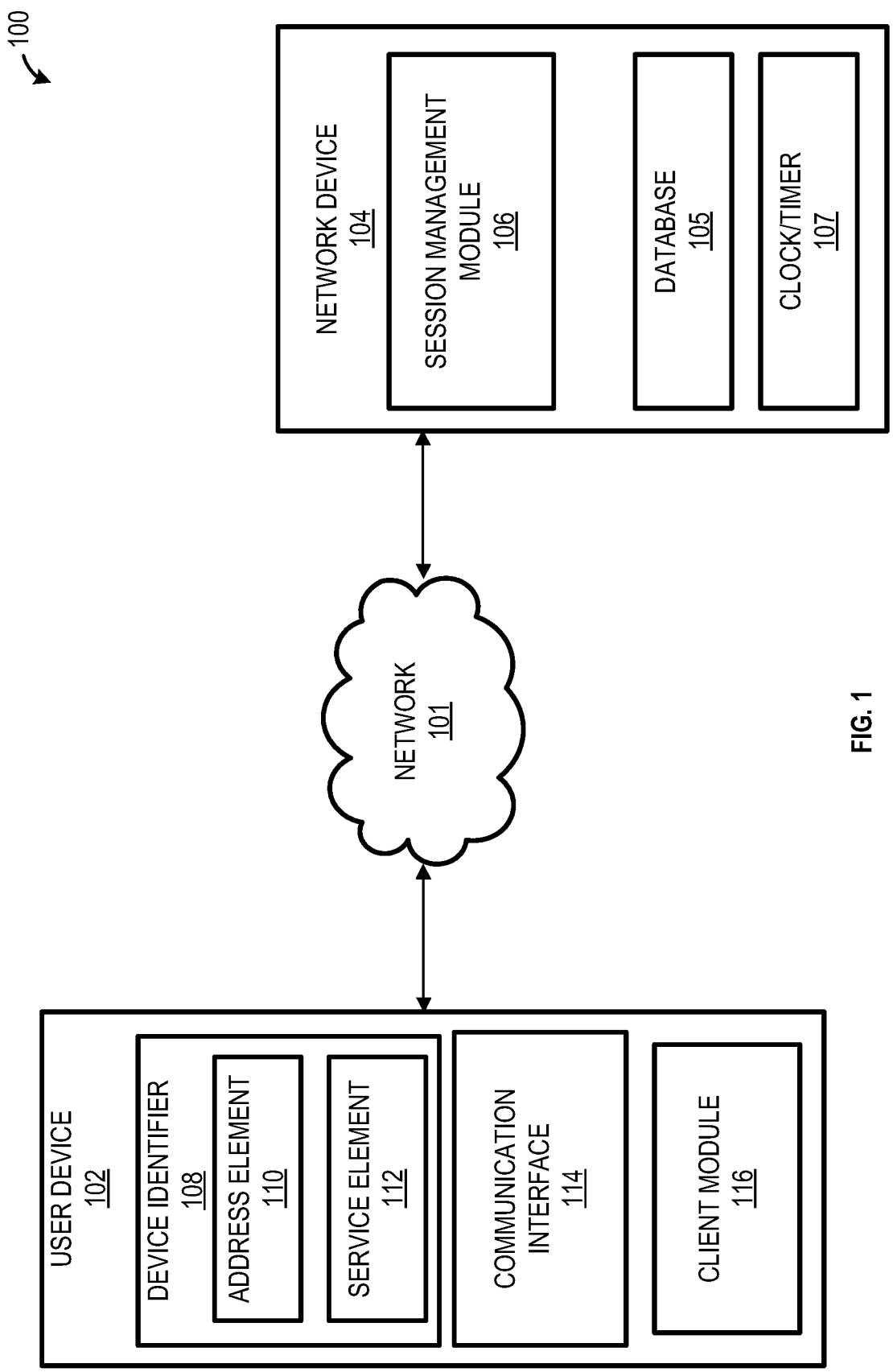
FIG. 1 shows an example system for managing a communication session.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. When values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Accordingly, blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

This detailed description may refer to a given entity performing some action. It should be understood that this language may in some cases mean that a system (e.g., a computer) owned and/or controlled by the given entity is actually performing the action.

Methods and systems are described herein for managing a communication session. By adjusting the supported communication rate of a network device, the network device may be able to continue an authentication and/or handshake process in an effort to initiate a communication session with a user device. Accordingly, when a user device has a supported communication rate (e.g., requested data communication rate, such as a requested beacon data communication rate) which is not supported by the network device, an authentication and/or handshake session may still continue in an effort to initiate a communication session between the network device and the user device.

The system may comprise a network device (e.g., a wireless router, a gateway, an access point, a node, etc.) and a user device (e.g., a client device, a personal computer, computing station, workstation, portable computer, laptop computer, mobile phone, tablet device, smartphone, smartwatch, activity tracker, smart apparel, smart accessory, security and/or monitoring device, a mobile device, a game system, a content output device, an IoT device, etc.).

When a user device is in proximity of a network device, the user device may send one or more requests (e.g., a broadcast of probe requests) seeking a capable network device to associate to. Some user devices may function in the 2.4 GHz band as it is more tolerant of distance and stable connectivity. However, operating in the 2.4 GHz band result in lower modulation but stable rates. As such, the user device may seek to initiate a communication session or conduct the authentication and/or handshake process at the lowest beacon data communication rates possible (e.g., the requested data communication rate, such as the requested beacon data communication rate). For example, the requested data communication rate (e.g., the requested beacon data communication rate) may be a maximum data communication rate at which the user device will initiate a communication session with a network device. However, once the communication session is initiated with the network device, the user device may communicate with the network device at a data communication rate that is greater than the requested data communication rate. For example, the requested data communication rate may be 1 megabit per second (Mbps), 2 Mbps, and/or 5.5 Mbps.

Certain network devices and/or certain network device using certain communication protocols have supported communication rates during the initiation of a communication session (e.g., an authentication and/or handshake process) that may be all higher than the requested data communication rates of the user device. For example, the slowest supported communication rate (e.g., advertised beacon data communication rate) for these network devices may be 6 Mbps or faster.

The network device may receive the request from the user device and determine that the network device cannot satisfy a communication rate corresponding to the requested data communication rate for the user device in the request. The network device may determine to use a second communication protocol that includes a supported communication rate (e.g., an advertised beacon data communication rate) that satisfies one of the requested data communication rates for the user device in the request. The network device may send a response (e.g., a probe response) to the user device at the requested data communication rate using the second communication protocol. The network device may initiate a communication session with the user device using the second communication protocol. The network device may periodically check to determine if the network device is still connected to the user device. Based on a determination that the network device is no longer connected to the user device, the network device may switch communication protocols from the second communication protocol back to the first communication protocol.

The network device may receive the request from the user device and determine that the network device cannot satisfy a communication rate corresponding to the requested data communication rate for the user device in the request. The network device may modify, adjust, or add a second advertised data communication rate based on the requested data communication rate to the one or more advertised data communication rates of the network device. The second advertised data communication rate may be less than each of the original one or more advertised data communication rates of the network device. For example, the second advertised data communication rate may satisfy (e.g., equal the requested data communication rate of the user device. The network device may send a response to the user device at a communication rate corresponding to the second advertised data communication rate and/or the requested data communication rate. For example, network device may receive a second request from the user device. In response to the second request, the network device may send a second response to the user device at a communication rate corresponding to another communication rate that is greater than the second advertised data communication rate (e.g., the second advertised beacon data communication rate). For example, the second response may be sent from the network device to the user device at a communication rate corresponding to a rate that is between the second advertised data communication rate of the network device and one of the original advertised data communication rates of the network device. For example, each subsequent response sent by the network device to the user device may be at a communication rate faster than the second advertised data communication rate of the network device and/or may be sent at a communication rate that is faster than the communication rate of the immediately prior response sent by the network device (e.g., a progressive ramp up in communication rates used for responses sent by the network device to the user device). The ramp up or increase in communication rates used for responses may continue until the slowest original advertised data communication rate is reached or until another communication rate is reached that is greater than the original advertised data communication rate of the network device.

The network device may determine a faux advertised beacon data communication rate that corresponds to one of the requested data communication rates of the user device. The faux advertised beacon data communication rate may be a communication rate that the network device does not communicate at. The network device may be configured to provide a response that alleges the network device may be configured to communicate at the faux communication rate (e.g., advertised beacon data communication rate) with the user device in an effort to continue the authentication and/or handshake process with the user device to initiate a communication session. The network device may send the response (e.g., a probe response) to the user device at a communication rate other than the faux advertised beacon data communication rate. For example, the network device may send the response to the user device at a communication rate faster than the faux advertised beacon data communication rate (e.g., one of the original advertised beacon data communication rates for the network device). The network device may also subsequently send a second response and an third response to the user device. In each of the second response and the third response, the network device may list the faux advertised beacon data communication rate as a supported communication rate (e.g., and advertised beacon data communication rate) for the network device, but may send the second response and/or the third response at one of the original advertised beacon data communication rates for the network device (e.g., a communication rate different than the faux advertised beacon data communication rate) to initiate a communication session.

The network device may adjust the supported communication rate for the network device to comprise at least one communication rate (e.g., a second advertised data communication rate, such as a second advertised beacon data communication rate) that corresponds to the requested data communication rate for the user device. The network device may send the response to the user device at the second advertised data communication rate. The network device may also subsequently send the second response and the third response to the user device. In each of the second response and the third response, the network device may list the second advertised data communication rate as a supported communication rate for the network device, but may send the second response and/or the third response at a communication rate faster than the second advertised data communication rate (e.g. one of the original advertised data communication rates for the network device or a communication rate between the second advertised data communication rate and one of the original advertised beacon data communication rates for the network device) to initiate a communication session between the network device and the user device.

FIG. 1 shows a system 100 for management of a communication session. Although only certain devices and/or components are shown, the system may comprise a variety of other devices and/or components that support a wide variety of network and/or communication functions, operations, protocols, content, services, and/or the like. For example, the system 100 may support and/or facilitate a Domain Name System (DNS), Hypertext Transfer Protocol (HTTP), Hypertext Transfer Protocol Secure (HTTPS), DNS over HTTPS (DoH), Transport Layer Security (TLS) protocol, DNS over TLS (DoT), encrypted DNS, and/or the like.

The system 100 may comprise a network 101. The network 101 may comprise a packet-switched network (e.g., an Internet protocol-based network), a non-packet switched network (e.g., quadrature amplitude modulation based network), and/or the like. The network 101 may comprise network adapters, switches, routers, modems, and the like connected through wireless links (e.g., radiofrequency, satellite, etc.) and/or physical links (e.g., fiber optic cable, coaxial cable, Ethernet cable, or a combination thereof). The network 101 may comprise public networks, private networks, wide area networks (e.g., Internet), local area networks, and/or the like. The network 101 may comprise a content access network, content distribution network, and/or the like. The network 101 may be configured to provide communication from telephone, cellular, modem, and/or other electronic devices to and throughout the system 100. The network 101 and/or devices in communication and/or associated with the network 101 may provide, facilitate, and/or support one or more services, applications, and/or protocols, such as a DNS, HTTP, HTTPS, DoH, TLS protocol, DoT, encrypted DNS, and/or the like. The network 101 may be configured to be in communication with one or more of a user 102, a network device 104, and/or any other device/component.

The user device 102 (e.g., a client device, a personal computer, computing station, workstation, portable computer, laptop computer, mobile phone, tablet device, smartphone, smartwatch, activity tracker, smart apparel, smart accessory, security and/or monitoring device, a mobile device, a game system, a content output device, an IoT device, etc.) may be associated with a user identifier or device identifier 108. The device identifier 108 may be any identifier, token, character, string, or the like, for differentiating one user and/or user device (e.g., user device 102) from another user or user device. The device identifier 108 may identify a user or user device as belonging to a particular class of users or user devices. The device identifier 108 may comprise information relating to the user device such as a manufacturer, a model or type of device, a service provider associated with the user device 102, a state of the user device 102, a locator, a label, and/or classifier. Other information may be represented by the device identifier 108.

The device identifier 108 may comprise an address element 110 and a service element 112. The address element 110 may comprise a network address (e.g., an IP address, etc.), a media access control (MAC) address, or the like. The address element 110 may be used to establish a communication session between the user device 102, the network device 104, other devices and/or components of the system 100, and/or the like. The address element 110 may be used as an identifier and/or locator of the user device 102. The address element 110 may be persistent for a particular network (e.g., network 101).

The service element 112 may comprise an identification of a service provider associated with the user device 102 and/or with the class of user device 102. The class of the user device 102 may be related to a type of device, a device capability, type of service being provided, and/or a level of service (e.g., business class, service tier, service package, etc.). The service element 112 may comprise information associated with a communication service provider (e.g., Internet service provider) that is providing or enabling data flow such as communication services to the user device 102. The service element 112 may comprise information relating to a preferred service provider for one or more particular services relating to the user device 102. The address element 110 may be used to identify or retrieve data from the service element 112, or vice versa. The address element 110 and/or the service element 112 may be stored remotely from the user device 102 and retrieved by one or more devices such as the user device 102, and/or the network device 104. Other information may be represented by the service element 112.

The user device 102 may comprise and/or be associated with a communication interface 114. The communication interface 114 may enable a user to interact with the user device 102, the network device 104, and/or any other device/component of the system 100. The communication interface 114 may comprise and/or be associated with software, hardware, and/or interfaces that may be used to provide communication between a user and one or more of the user device 102, the network device 104, and/or any other device/component of the system 100. The communication interface 114 may be used to request or query various files from a local source and/or a remote source, such as the network device 104, and/or the like.

The user device 102 may comprise a client module 116. The client module 116 may be an application, such as a web application, a user-agent based application (e.g., a single-page, browser-based, application), a native application, a DNS client engine, a mobile application, and or the like that is implemented/run on and/or associated with the user device 102. The client module 116 may support and/or facilitate one or more services, applications, and/or protocols, such as a DNS, HTTP, HTTPS, DoH, TLS protocol, DoT, encrypted DNS, and/or the like. The user device 102 may, for example, via the client module 116, request a communication session. The user device 102 may, for example, request a communication session with the network device 104.

A request for a communication session may be received, for example, as part of an authentication and/or handshake process (e.g., a TLS handshake, etc.) and/or after a successful authentication and/or handshake process. The authentication and/or handshake process may include several interactions between the network device 104 and the user device 102 before a communication session is initiated between the network device 104 and the user device 102. For example, the network device 104 may receive a request for a communication session as part of an authentication and/or handshake process with the user device 102 and/or after a successful authentication and/or handshake process with the user device 102.

The network device 104 may comprise a session management module 106. The network device 104 may receive a request for a communication session and use the session management module 106 to determine and/or generate a corresponding session token (and/or a session ID). A session token (and/or a session ID) may be determined/generated through a random unique string generating process, a hashing algorithm, and/or any other method/means. A session token (and/or a session ID) may be stored (e.g., in a communication management array table), for example, by the network device 104, in a local and/or remote storage (e.g., database 105) with associated information, such as a device identifier (e.g., a device identifier 108, etc.), user/client identifier, a time interval (e.g., a time-to-live (TTL) value, etc.), a device profile, and/or the like. A session token (and/or a session ID) may be encrypted and/or decrypted in accordance with the protocols (e.g., TLS protocol, etc.) associated with the system 100.

The network device 104 may also comprise a clock and/or timer 107 for monitoring requests for communication sessions and communications sessions (e.g., a communication session between the user device 102 and the network device 104). A time interval associated with a request for a communication session may be determined, for example, by the network device 104. The network device 104, based on the nature of a request for a communication session, may determine and/or update a predetermined and/or default time interval and/or determine a time interval during which the user device 102 may establish and/or re-establish the communication session using a session token.

The network device 104 may respond to a request for a communication session from the user device 102 with a session token (and/or a session ID) and an indication of a determined time interval for the session token. The session token may be, for example, encrypted and embedded within a response to the user device 102 according to the protocol of the system 100, such as a TLS protocol or the like. The network device 104 may then implement the clock/timer 107 to monitor the time interval.

Figure 2:
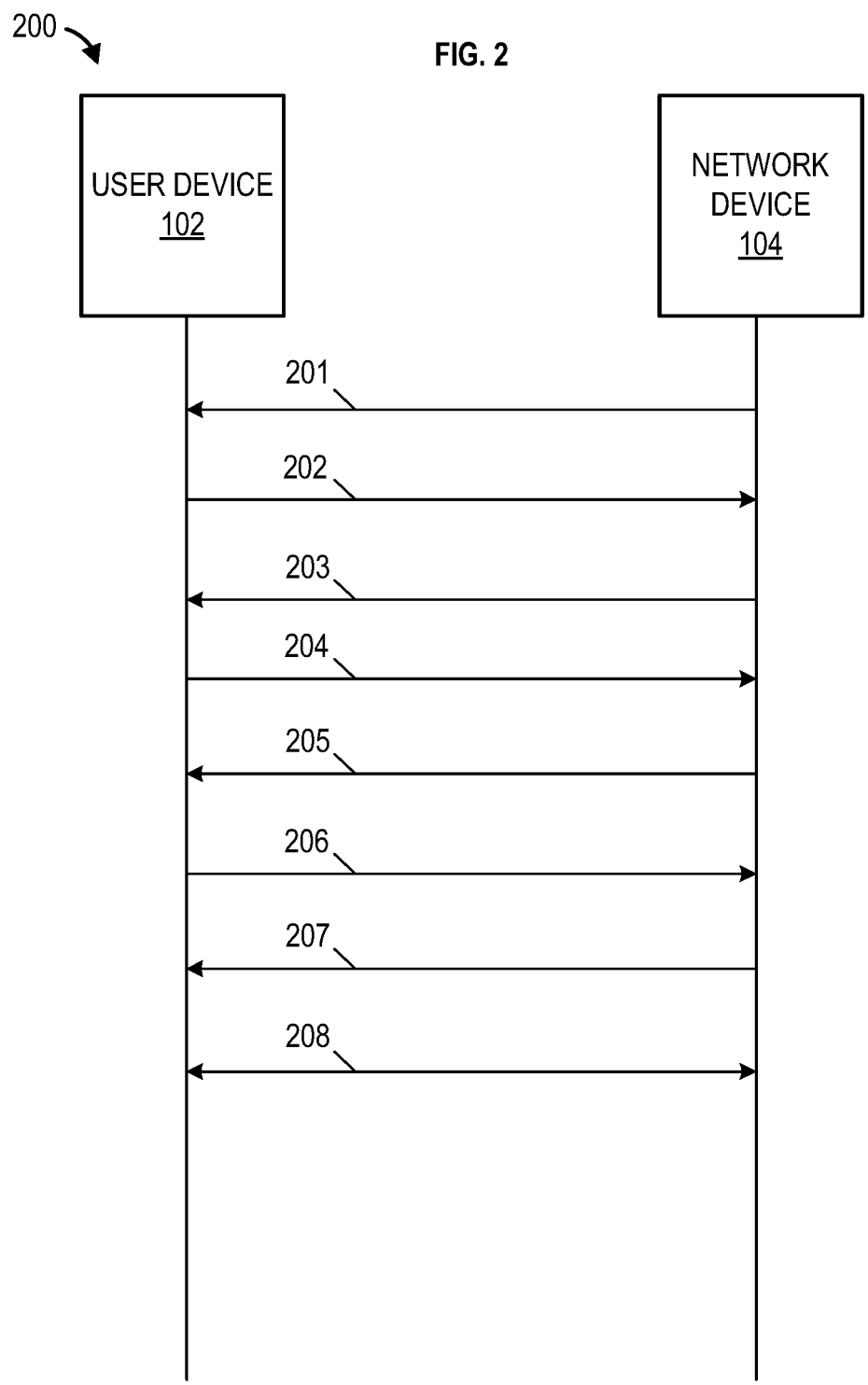
FIG. 2 shows an example communication diagram for managing a communication session.

FIG. 2 shows an example diagram 200 for managing a communication session. The communication diagram 200 shows example communications between the user device 102 and a network device 104 to establish a communication session.

The network device 104 may send or otherwise transmit a first communication frame 201 (e.g., a management frame, such as a beacon frame). The first communication frame 201 may contain information about the network (e.g., the network 101). First communication frames 201 may be sent or otherwise transmitted periodically by the network device 104. For example, first communication frames 201 may be sent at a preset time period or at a defined interval. The first communication frame 201 may be configured to announce the presence of a network (e.g., the network 101) to other devices (e.g., the user device 102). The first communication frame 201 may also be configured to synchronize the members of the service set within the network (e.g., the network 101).

The first communication frame 201 may comprise a MAC header (e.g., an 802.11 MAC header), a body, and a frame check sequence (FCS). The body of the first communication frame 201 may comprise a timestamp, a beacon interval, network capability information, a network name (e.g., a service set identifier (SSID)), encryption capabilities of the network, supported communication rates (e.g., at least one advertised beacon data communication rate), a frequency-hopping parameter set, a direct-sequence parameter set, a contention-free parameter set, an independent basic service set (IBSS) parameter set, and/or a traffic indication map. The network capability information may comprise the capabilities of the advertised network (e.g., the network 101) and/or the type (e.g., ad hoc, infrastructure, etc.) of the advertised network.

The user device 102 may send or otherwise transmit a second communication frame 202 (e.g. a management frame, such as a request frame or a probe request frame). The second communication frame 202 may be configured to identify networks (e.g., the network 101) within a proximity or within communication range of the user device 102. The second communication frame 202 may be sent from the user device 102 to a specific network device 104 or may be sent (e.g., broadcast) by the user device 102 for receipt by any network device within communication range of the user device 102. The second communication frame 202 may comprise an identifier of the user device 102 (e.g., a device ID), a network name (e.g., SSID), one or more supported communication rates (e.g., a requested data communication rate, such as a requested beacon data communication rate or other communication rates), one or more supported communication protocols (e.g., 802.11, 802.11a, 802.11b, 802.11g, 802.11n, 802.11ac, 802.11ax, Bluetooth, Zigbee, Z-Wave, etc.), desired network capabilities, user device encryption capabilities, and channel usage. For example, the requested data communication rate (e.g., the requested beacon data communication rate) may be a maximum data communication rate at which the user device will initiate a communication session with a network device. However, once the communication session is initiated with the network device, the user device may communicate with the network device at a data communication rate that is greater than the requested data communication rate. The user device 102 may initiate a timer when the second communication frame 202 is sent. If the timer runs out or reaches a predetermined time period, the user device 102 may cease waiting for a response or any additional responses from a network device (e.g., network device 104).

The network device 104 may receive the second communication frame 202. The network device 104 may send or otherwise transmit a third communication frame 203 (e.g., a management frame, such as a response frame or a probe response frame). The third communication frame 203 may be sent in response to receiving the second communication frame 202 from the user device 102. The third communication frame 203 may be sent from the network device 104 to the user device 102. The third communication frame 203 may comprise a timestamp, a beacon interval, network capability information, a network name (e.g., SSID), encryption capabilities of the network, supported communication rates (e.g., at least one advertised data communication rate, such as an advertised beacon data communication rate), a frequency-hopping parameter set, a direct-sequence parameter set, a contention-free parameter set, an IBSS parameter set, capacity information, channel availability, and/or a traffic indication map. For example, the advertised data communication rate (e.g., the advertised beacon data communication rate) may be a minimum data communication rate at which the network device 104 will initiate a communication session with a user device 102. For example, the advertised data communication rate may be a basic communication rate of the 802.11 protocol. The network capability information may comprise the capabilities of the advertised network (e.g., the network 101) and/or the type (e.g., ad hoc, infrastructure, etc.) of the advertised network.

The third communication frame 203 may be sent to the user device 102 at a common supported communication rate (e.g., the beacon data communication rate). For example, the common supported communication rate may be a lowest common supported communication rate. Initially communicating at a lower communication rate allows for a lower modulation rate and a higher gain, which may allow for a greater communication range. Once a communication session is established between the user device 102 and the network device 104, the network device 104 may send a subsequent packet with additional communication rates for communicating with the user device 102. These additional communication rates may be much faster than the initial beacon data communication rate at which the user device 102 and network device 104 first communicated. For example, if the second communication frame 202 lists supported communication rates (e.g., the requested data communication rate, such as the requested beacon data communication rate) of 1 Mbps, 2 Mbps, and 5.5 Mbps for the user device 102 and the third communication frame 203 lists supported communication rates (e.g., advertised beacon data communication rate) of 5.5 Mbps, 24 Mbps, and 48 Mbps, then the common supported communication rate would be 5.5 Mbps. Further, the lowest common supported communication rate would also be 5.5 Mbps. The third communication frame 203 may be sent from the network device 104 to the user device 102 at a beacon data communication rate of 5.5 Mbps.

The user device 102 and the network device 104 may not have a common supported communication rate. Typically, that would result in the network device 104 sending a third communication frame 203 in response to the second communication frame 202 from the user device 102. However, the user device 102 may not be able to associate with the network device 104 which is not supported by the network device based on the lack of common supported data communication rates in the third communication frame 203 received from the network device 104. The lack of a common supported data communication data rate may be based on the communication protocol being used by the network device 104. For example, a first communication protocol may not have a common supported communication rate with the list of supported communication rates (e.g., the requested data communication rate, such as the requested beacon data communication rate) provided by the user device 102 in the second communication frame 202, but a second communication protocol may have a common supported communication rate with at least one of the list of supported communication rates (e.g., the requested data communication rate, such as the requested beacon data communication rate) provided by the user device 102 in the second communication frame 202. In that example, the network device 104 may change the communication protocol that the network device 104 is using from the first communication protocol to the second communication protocol in order to determine the common supported communication rate (e.g., the lowest common supported communication rate) and send a third communication frame 203 to the user device 102 at the common supported communication rate (e.g., the requested data communication rate, such as the requested beacon data communication rate).

The user device 102 and the network device 104 may not have a common supported communication rate. Typically, that would result in the network device 104 sending a third communication frame 203 in response to the second communication frame 202 from the user device 102. However, the user device 102 may not be able to associate with the network device 104 based on the lack of common supported data communication rates in the third communication frame 203 received from the network device 104. The network device 104 may determine that it does not have a common supported communication rate with the supported data communication rate(s) (e.g., the requested data communication rate, such as the requested beacon data communication rate) of the user device 102 provided in the second communication frame 202. For example, all of the supported communication rates (e.g., advertised beacon data communication rates) of the network device 104 may be greater than the supported communication rate(s) (e.g., the requested data communication rate, such as the requested beacon data communication rate) of the user device 102 in the second communication frame 202. In another example, all of the supported communication rates (e.g., advertised beacon data communication rates) of the network device 104 may be less than the supported communication rates (e.g., the requested data communication rate, such as the requested beacon data communication rate) of the user device 102 in the second communication frame 202. The network device 104 may temporarily adjust its supported communication rates to comprise another supported communication rate (e.g., a second advertised data communication rate, such as a second advertised beacon data communication rate) that satisfies (e.g., equals one of) the supported communication rates (e.g., the requested data communication rate, such as the requested beacon data communication rate) of the user device 102 in the second communication frame 202. This temporarily supported communication rate (e.g., the second advertised data communication rate) may be listed as one of the supported communication rates for the network device 104 in the response. The network device 104 may then send the third communication frame 203 at the temporarily supported communication rate (e.g., the second advertised data communication rate). Subsequent communications from the network device 104 to the user device 102 may be at a communication rate different than that of the temporarily supported communication rate (e.g., the second advertised data communication rate). The subsequent communications from the network device 104 to the user device 102 may be at a communication rate greater than the temporarily supported communication rate. In other examples, the subsequent communication from the network device 104 to the user device 102 may be at a communication rate that is less than the temporarily supported communication rate (e.g., the second advertised data communication rate).

The user device 102 and the network device 104 may not have a common supported communication rate. Typically, that would result in the network device 104 sending a third communication frame 203 in response to the second communication frame 202 from the user device 102. However, the user device 102 may not be able to associate with the network device 104 based on the lack of common supported data communication rates in the third communication frame 203 received from the network device 104. The network device 104 may determine that it does not have a common supported communication rate with the supported communication rate(s) (e.g., the requested data communication rate, such as the requested beacon data communication rate) of the user device 102 provided in the second communication frame 202. For example, all of the supported communication rates (e.g., advertised beacon data communication rates) of the network device 104 may be greater than the supported communication rate(s) (e.g., the requested data communication rate, such as the requested beacon data communication rate) of the user device 102 in the second communication frame 202. In another example, all of the supported communication rates (e.g., advertised beacon data communication rates) of the network device 104 may be less than the supported communication rates (e.g., the requested data communication rate, such as the requested beacon data communication rate) of the user device 102 in the second communication frame 202. The network device 104 may add a faux or fake supported communication rate (e.g., a faux advertised beacon data communication rate) to its listing of supported communication rates in the supported communication rates field of the third communication frame 203. The faux supported communication rate (e.g., faux advertised beacon data communication rate) may be a communication rate at which the network device 104 does not communicate using the current communication protocol of the network device 104, does not intend to communicate, and/or is a communication rate that is not one of the supported communication rates for the network device 104. The faux supported communication rate (e.g., faux advertised beacon data communication rate) may be inserted into the supported communication rates field of the third communication frame 203 in an effort to establish an initial connection with the user device 102. The faux supported communication rate (e.g. the faux advertised beacon data communication rate) may correspond to (e.g., equal) one of the supported communication rates (e.g., the requested data communication rate, such as the requested beacon data communication rate) of the user device 102 in the second communication frame 202. The network device 104 may then send the third communication frame 203 at a supported communication rate that is different than the faux supported communication rate (e.g. the faux advertised beacon data communication rate). For example, the third communication frame 203 may be sent by the network device 104 at a communication rate that is greater than the faux supported communication rate (e.g. the faux advertised beacon data communication rate) listed in the third communication frame 203. For example, the third communication frame 203 may be sent by the network device 104 at a communication rate that is less than the faux supported communication rate (e.g. the faux advertised beacon data communication rate) listed in the third communication frame 203. Subsequent communications from the network device 104 to the user device 102 may be at a communication rate different than that of the faux supported communication rate (e.g. the faux advertised beacon data communication rate). The subsequent communications from the network device 104 to the user device 102 may be at a communication rate greater than the faux supported communication rate (e.g. the faux advertised beacon data communication rate). In other examples, the subsequent communication from the network device 104 to the user device 102 may be at a communication rate that is less than the faux supported communication rate (e.g. the faux advertised beacon data communication rate).

The user device 102 may receive the third communication frame 203. The user device 102 may send or otherwise transmit a fourth communication frame 204 (e.g., a management frame, such as a request frame or an authentication request frame). The fourth communication frame 204 may be sent in response to receiving the third communication frame 203 from the network device 104. The fourth communication frame 204 may be sent from the user device 102 to the network device 104.

The fourth communication frame 204 may allow the user device 102 to establish an identity with the network device 104. The fourth communication frame 204 may comprise a MAC header, frame body, and FCS. The MAC header of the fourth communication frame 204 may comprise the source of the fourth communication frame 204 (e.g., an identifier of the user device 102, such as a user device ID, user device name, or MAC address of the user device 102) and a destination of the fourth communication frame 204 (e.g., an identifier of the network device 104, such as a network device ID, network device name, or MAC address of the network device 104). The body of the fourth communication frame 204 may comprise an authentication algorithm number (indicating if it is an open system or shared key network), a transaction number (indicating the number of transactions between the user device 102 and the network device 104), a status code (indicating success or failure of the authentication) and channel text (which may be used for shared key authentication). In a shared key authentication, the challenge text of the fourth communication frame 204 may also comprise a shared key or password. The fourth communication frame 204 may be sent from the user device 102 to the network device 104 at the common supported communication rate (e.g., the lowest common supported communication rate and/or the requested data communication rate, such as the requested beacon data communication rate). The fourth communication frame 204 may be sent from the user device 102 to the network device 104 at the temporarily supported communication rate (e.g., the second advertised data communication rate). The fourth communication frame 204 may be sent from the user device 102 to the network device 104 at a communication rate different from the temporarily supported communication rate (e.g., at a rate greater than or less than the second advertised data communication rate). The fourth communication frame 204 may be sent from the user device 102 to the network device 104 at a communication rate different from the faux supported communication rate (e.g., at a rate greater than or less than the faux advertised beacon data communication rate).

The network device 104 may receive a fourth communication frame 204. The network device 104 may send or otherwise transmit a second response (e.g., an authentication response). The second response may comprise a fifth communication frame 205 (e.g., a management frame, such as a second response frame or authentication response frame). The fifth communication frame 205 may be sent in response to receiving the fourth communication frame 204 from the user device 102. The fifth communication frame 205 may be sent from the network device 104 to the user device 102.

The fifth communication frame 205 may comprise a MAC header, frame body, and FCS. The MAC header of the fifth communication frame 205 may comprise a source of the second response (e.g., an identifier of the network device 104, such as a network device ID, network device name, or MAC address of the network device 104) and a destination of the second response (e.g., an identifier of the user device 102, such as a user device ID, user device name, or MAC address of the user device 102). The body of the fifth communication frame 205 may comprise an authentication algorithm number (indicating if it is an open system or shared key network), a transaction number (indicating the number of transactions between the user device 102 and the network device 104), and a status code (indicating success or failure of the authentication). The fifth communication frame 205 may be sent from the network device 104 to the user device 102 at the common supported communication rate (e.g., the lowest common supported communication rate and/or the requested data communication rate, such as the requested beacon data communication rate). The fifth communication frame 205 may be sent from the network device 104 to the user device 102 at the temporarily supported communication rate (e.g., the second advertised data communication rate). The fifth communication frame 205 may be sent from the network device 104 to the user device 102 at a communication rate different from the temporarily supported communication rate (e.g., at a rate greater than or less than the second advertised beacon data communication rate). The fifth communication frame 205 may be sent from the network device 104 to the user device 102 at a communication rate different from the faux supported communication rate (e.g., at a rate greater than or less than the faux advertised beacon data communication rate).

The user device 102 may receive the fifth communication frame 205. The user device 102 may send or otherwise transmit a third request (e.g., an association request). The third request may comprise a sixth communication frame 206 (e.g., a management frame, such as a third request frame or association request frame). The sixth communication frame 206 may be sent in response to receiving the fifth communication frame 205 from the network device 104. The sixth communication frame 206 may be sent from the user device 102 to the network device 104.

The sixth communication frame 206 may allow the user device 102 to join the network (e.g., the network 101) associated with the network device 104. The sixth communication frame 206 may comprise a MAC header, frame body, and FCS. The MAC header of the sixth communication frame 206 may comprise the source of the third request (e.g., an identifier of the user device 102, such as a user device ID, user device name, or MAC address of the user device 102) and a destination of the third request (e.g., an identifier of the network device 104, such as a network device ID, network device name, or MAC address of the network device 104). The body of the sixth communication frame 206 may comprise network capability information for the user device 102 (e.g., the type of network that the user device 102 wants to join with), a listening interval (e.g., how often the user device 102 listens to first communication frames in order to monitor the traffic indication map), a network name (e.g., SSID) of the network to be joined (e.g., the network 101) and supported communication rates (e.g., the requested data communication rates, such as the requested beacon data communication rates) for the user device 102. The sixth communication frame 206 may be sent from the user device 102 to the network device 104 at the common supported communication rate (e.g., the lowest common supported communication rate and/or the requested data communication rate, such as the requested beacon data communication rate). The sixth communication frame 206 may be sent from the user device 102 to the network device 104 at the temporarily supported communication rate (e.g., the second advertised data communication rate). The sixth communication frame 206 may be sent from the user device 102 to the network device 104 at a communication rate different from the temporarily supported communication rate (e.g., at a rate greater than or less than the second advertised data communication rate). The sixth communication frame 206 may be sent from the user device 102 to the network device 104 at a communication rate different from the faux supported communication rate (e.g., at a rate greater than or less than the faux advertised beacon data communication rate).

The network device 104 may receive the sixth communication frame 206. The network device 104 may send or otherwise transmit a third response (e.g., an association response). The third response may comprise a seventh communication frame 207 (e.g., a management frame, such as a third response frame or association response frame). The seventh communication frame 207 may be sent in response to receiving the sixth communication frame 206 from the user device 102. The seventh communication frame 207 may be sent from the network device 104 to the user device 102.

The seventh communication frame 207 may comprise a MAC header, frame body, and FCS. The MAC header of the seventh communication frame 207 may comprise the source of the seventh communication frame 207 (e.g., an identifier of the network device 104, such as a network device ID, network device name, or MAC address of the network device 104) and a destination of the seventh communication frame 207 (e.g., an identifier of the user device 102, such as a user device ID, user device name, or MAC address of the user device 102). The body of the seventh communication frame 207 may comprise network capability information for the network device 102, a status code (indicating success or failure) of the user device's connection to the network (e.g., network 101), an association identifier (e.g., an identifier assigned by the network device 104 to the user device 102 and used by the network device 104 to monitor the connection status of the user device 102 to the network), and supported communication rates (e.g., the advertised beacon data communication rates) for the network device 104. The seventh communication frame 207 may be sent from the network device 104 to the user device 102 at the common supported communication rate (e.g., the lowest common supported communication rate and/or the requested data communication rate, such as the requested beacon data communication rate). The seventh communication frame 207 may be sent from the network device 104 to the user device 102 at the temporarily supported communication rate (e.g., the second advertised data communication rate). The seventh communication frame 207 may be sent from the network device 104 to the user device 102 at a communication rate different from the temporarily supported communication rate (e.g., at a rate greater than or less than the second advertised data communication rate). The seventh communication frame 207 may be sent from the network device 104 to the user device 102 at a communication rate different from the faux supported communication rate (e.g., at a rate greater than or less than the faux advertised beacon data communication rate).

A communication session 208 may be initiated between the user device 102 and the network device 104. The communication session 208 may be initiated in response to a success indication in the seventh communication frame 207. As part of the communication session 208, the user device 102 may send or otherwise transmit requests for content via the network device 104 to other devices and may receive content via the network device 104 from other devices communicating with the network (e.g., network 101).

Figure 3:
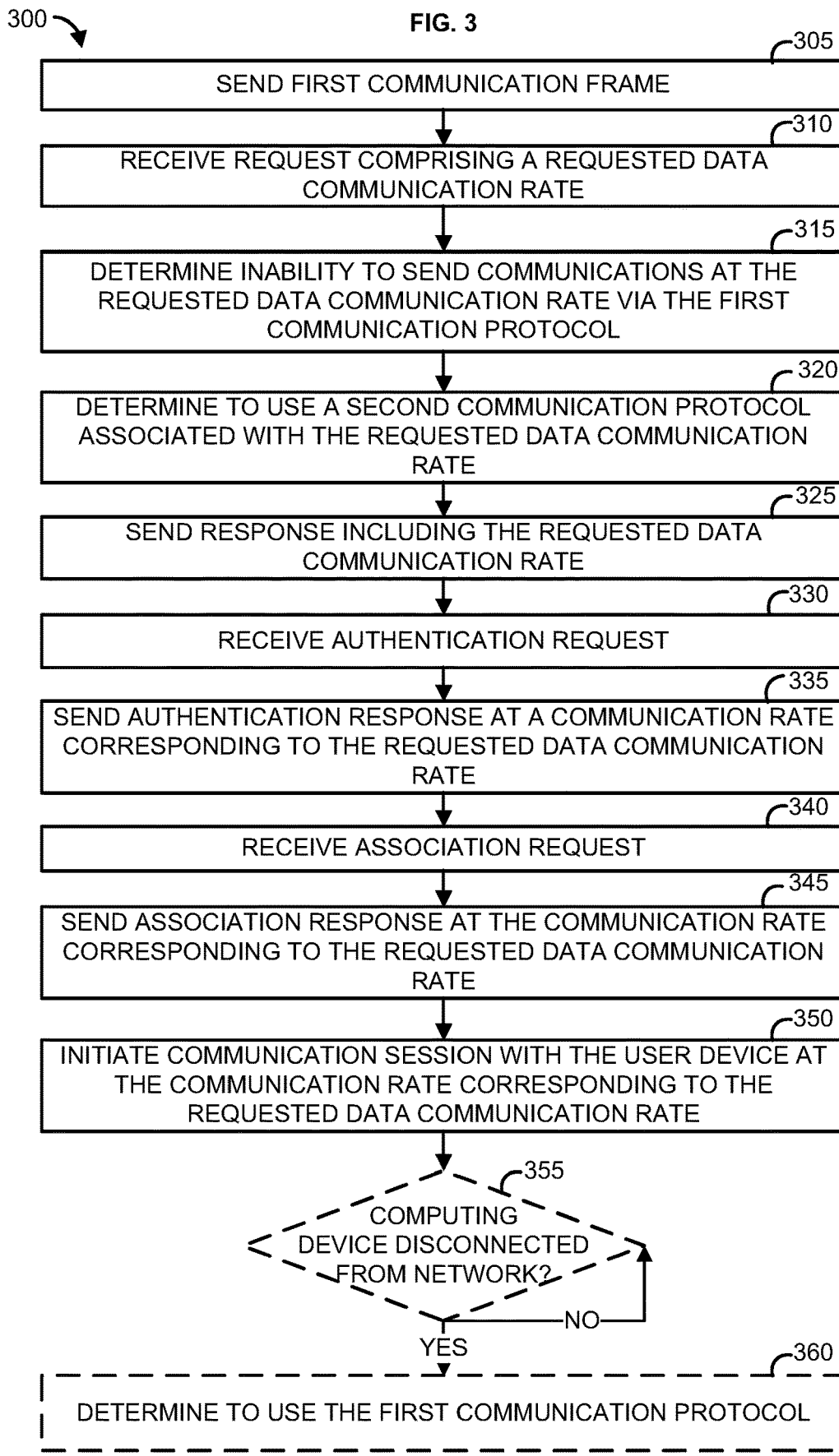
FIG. 3 shows a flowchart of an example method for managing a communication session.

FIG. 3 is a flowchart showing an example method 300 for managing a communication session. The management of a communication session may occur between a computing device (e.g., a network device 104) and a second computing device (e.g., a user device 102). The user device 102 may be at least one of a client device, a personal computer, computing station, workstation, portable computer, laptop computer, mobile phone, tablet device, smartphone, smartwatch, activity tracker, smart apparel, smart accessory, security and/or monitoring device, a mobile device, a game system, a content output device, or an IoT device. The network device 104 may be at least one of a wireless router, a gateway, an access point, or a node.

At 305, a computing device (e.g., the network device 104) may send or otherwise transmit a first communication frame (e.g., the first communication frame 201). For example, the first communication frame may be a management frame, such as a beacon frame. The first communication frame may be configured for communication per one or more communication protocols. For example, the communication protocol may be at least one of 802.11, 802.11a, 802.11b, 802.11g, 802.11n, 802.11ac, 802.11ax, Bluetooth, Zigbee, or Z-Wave. The first communication frame may contain information about the network (e.g., the network 101). The first communication frame may be sent or otherwise transmitted periodically by the network device 104. For example, the first communication frame may be sent at a preset time period or at a defined or adjustable interval. The first communication frame may be configured to announce the presence of a network device (e.g., the network device 104) to other devices (e.g., the user device 102). The first communication frame may also be configured to synchronize the members of the service set within the network (e.g., the network 101).

The first communication frame may comprise a MAC header (e.g., an 802.11 MAC header), a body, and a FCS. The body of the first communication frame may comprise a timestamp, a beacon interval, network capability information, a network name (e.g., a SSID), encryption capabilities of the network, supported communication rates (e.g., at least one advertised beacon data communication rate), a frequency-hopping parameter set, a direct-sequence parameter set, a contention-free parameter set, an IBSS parameter set, and/or a traffic indication map. The network capability information may comprise the capabilities of the advertised network (e.g., the network 101) and/or the type (e.g., ad hoc, infrastructure, etc.) of the advertised network.

At 310, the computing device (e.g., the network device 104) may receive a request (e.g., a probe request). For example, a second computing device (e.g., the user device 102) may generate and send or otherwise transmit the request. The request may comprise a second communication frame (e.g., the second communication frame 202). For example, the second communication frame may comprise a management frame, such as a probe request frame. The second communication frame may be configured to identify networks (e.g., the network 101) within a proximity or within communication range of the user device 102. The second communication frame may be sent from the user device 102 to a specific computing device (e.g., the network device 104) or may be sent (e.g., broadcast) by the user device 102 for receipt by any computing device (e.g., any network device) within communication range of the user device 102.

The second communication frame may comprise a MAC header (e.g., an 802.11 MAC header), a body, and an FCS. The second communication frame may comprise an identifier of the user device 102 (e.g., a device name, a device ID, a MAC address for the user device 102), a network name (e.g., SSID), one or more supported communication rates (e.g., the requested data communication rate, such as the requested beacon data communication rate or other communication rates), one or more supported communication protocols (e.g., 802.11, 802.11a, 802.11b, 802.11g, 802.11n, 802.11ac, 802.11ax, Bluetooth, Zigbee, Z-Wave, etc.), desired network capabilities, user device encryption capabilities, and channel usage. For example, the requested data communication rate (e.g., the requested beacon data communication rate) may be a maximum data communication rate at which the user device 102 will initiate a communication session with a network device 104. However, once the communication session is initiated with the network device 104, the user device 102 may communicate with the network device 104 at a data communication rate that is greater than the requested data communication rate. The user device 102 may initiate a timer when the request is sent. If the timer runs out or reaches a predetermined time period, the user device 102 may cease waiting for a response or any additional responses from a network device (e.g., network device 104).

At 315, the computing device (e.g., the network device 104) may determine that it is not currently configured (e.g., currently unable) to send communications to the second computing device (e.g., the user device 102) at the requested data communication rate (e.g., the requested beacon data communication rate) via the first communication protocol (e.g., the current communication protocol being used by the computing device). For example, the network device 104 may determine the one or more supported communication rates (e.g., the requested data communication rate, such as the requested beacon data communication rate) provided in the request. The network device 104 may compare the one or more supported communication rates (e.g., the requested data communication rate, such as the requested beacon data communication rate) of the user device 102 to the one or more supported communication rates of the network device 104 (e.g., the advertised beacon data communication rate), as currently configured. For example, the advertised data communication rate (e.g., the advertised beacon data communication rate) may be a minimum data communication rate at which the network device 104 will initiate a communication session with a user device 102. For example, the advertised data communication rate may be a basic communication rate of the 802.11 protocol. The network device 104 may determine that none of the one or more supported communication rates for the network device 104 (e.g., the advertised data communication rate, such as an advertised beacon data communication rate), as currently configured using the first communication protocol, matches at least one of the one or more of the supported communication rates (e.g., the requested data communication rate, such as the requested beacon data communication rate) for the user device 102. For example, the second communication frame 202 may list supported communication rates (e.g., the requested data communication rate, such as the requested beacon data communication rate) of 1 Mbps for the user device 102 and the network device 104 may have supported communication rates (e.g., advertised beacon data communication rate) of 6 Mbps, 24 Mbps, and 48 Mbps, as currently configured under the communication protocol currently being used by the network device 104.

At 320, the computing device (e.g., the network device 104) may determine to use a second communication protocol associated with the requested data communication rate (e.g., the requested beacon data communication rate). For the second communication protocol may be capable of communicating with the user device 102 at or close to one or more of the supported communication rates (e.g., the requested data communication rate, such as the requested beacon data communication rate) of the user device 102. For example, the network device 104 may determine to use the second communication protocol based on determining that the network device 104, using the first communication protocol, is not currently configured to communicate using a supported communication rate (e.g., an advertised data communication rate, such as an advertised beacon data communication rate) that matches or is substantially the same as at least one of the supported communication rates (e.g., the requested data communication rate, such as the requested beacon data communication rate) of the user device 102. The network device 104 may evaluate other communication protocols that are available (e.g., stored in the database 105 of the network device 104) for use by the network device 104, to determine if any of the other available communication protocols support one or more communication rates that satisfies (e.g., is equal to or substantially the same as) at least one supported communication rate (e.g., the requested data communication rate, such as the requested beacon data communication rate) of the user device 102 in the request (e.g., the second communication frame). The network device 104 may use another communication protocol (e.g., the second communication protocol) for communications by the network device 104. For example, the first communication protocol and the second communication protocol may have at least one different supported communication rate. For example, the use of the second communication protocol may be based on the determination that the second communication protocol supports one or more communication rates that satisfies (e.g., is equal to or is substantially the same as) at least one supported communication rate (e.g., the requested data communication rate, such as the requested beacon data communication rate) of the user device 102. The network device 104 may use the second communication protocol for subsequent communications with the user device 102 and optionally other computing devices. For example, each of the first communication protocol and the second communication protocol may be a wireless communication protocol. For example, the first communication protocol may be at least one of 802.11, 802.11a, 802.11b, 802.11g, 802.11n, 802.11ac, 802.11ax, Bluetooth, Zigbee, or Z-Wave. For example, the second communication protocol may be at least one of 802.11, 802.11a, 802.11b, 802.11g, 802.11n, 802.11ac, 802.11ax, Bluetooth, Zigbee, or Z-Wave. For example, the first communication protocol may be at least one of 802.11ac or 802.11ax and the second communication protocol may be at least one of 802.11b, 802.11g, or 802.11n.

At 325, the computing device (e.g., the network device 104) may generate and/or send a response (e.g., a probe response). The response may comprise a third communication frame (e.g., the third communication frame 203). For example, the third communication frame 203 may comprise a management frame, such as a response frame or a probe response frame. The third communication frame 203 may comprise the requested data communication rate (e.g., the requested beacon data communication rate). For example, the response (e.g., the third communication frame 203) may comprise the requested data communication rate (e.g., the requested beacon data communication rate) in a listing of supported communication rates in the supported communication rates field of the third communication frame 203. For example, the response may be sent from the network device 104 to the user device 102 at or substantially equal to one of the supported communication rates (e.g., the requested data communication rate, such as the requested beacon data communication rate) of the user device 102. For example, the response may be sent from the network device 104 to the user device 102 at a communication rate corresponding to one of the supported communication rates (e.g., the requested data communication rate, such as the requested beacon data communication rate) of the user device 102. For example, the communication rate corresponding to the one of the supported communication rates (e.g., the requested data communication rate, such as the requested beacon data communication rate) may comprise the one of the supported communication rates and a margin of error above and below the one of the supported communication rates. For example, the margin of error may be ten percent of the one of the supported communication rates, such that if the one of the supported communication rates is 1 Mbps, the communication rate corresponding to the one of the supported communication rates may include any communication rate between and including 900 bps and 1.1 Mbps. For example, the margin of error may be greater than or less than ten percent. For example, the response may be sent by the network device 104 using the second communication protocol. The response (e.g., the third communication frame 203) may be sent based on the network device 104 receiving the request (e.g., the second communication frame 202) from the user device 102.

The third communication frame 203 may comprise a MAC header (e.g., an 802.11 MAC header), a body, and an FCS. The third communication frame 203 may comprise a timestamp, a beacon interval, network capability information, a network name (e.g., SSID), encryption capabilities of the network, supported communication rates for the second communication protocol (e.g., at least one advertised beacon data communication rate for the second communication protocol), a frequency-hopping parameter set, a direct-sequence parameter set, a contention-free parameter set, an IBSS parameter set, capacity information, channel availability, and/or a traffic indication map. The network capability information may comprise the capabilities of the advertised network (e.g., the network 101) and/or the type (e.g., ad hoc, infrastructure, etc.) of the advertised network.

The third communication frame 203 may be sent to the user device 102 at or substantially near to the common supported communication rate (e.g., the lowest common supported communication rate and/or the beacon data communication rate). For example, if the request (e.g., the second communication frame 202) lists supported communication rates (e.g., the requested data communication rate, such as the requested beacon data communication rate) of 500 kbps and 1 Mbps for the user device 102 and the response (e.g., the third communication frame 203) lists supported communication rates (e.g., the advertised data communication rate, such as the advertised beacon data communication rate) of 1 Mbps, 5.5 Mbps, 24 Mbps, and 48 Mbps, then the common supported communication rate (e.g., the lowest common supported communication rate) would be 1 Mbps.

For example, the third communication frame 203 may be sent to the user device 102 at a communication rate corresponding to the common supported communication rate (e.g., the lowest common supported communication rate and/or the requested data communication rate (e.g., the requested beacon data communication rate) of the user device 102). For example, the communication rate corresponding to the common supported communication rate (e.g., the lowest common supported communication rate and/or the requested data communication rate, such as the requested beacon data communication rate) may comprise the common supported communication rate and a margin of error above and below the common supported communication rate. For example, the margin of error may be ten percent of the common supported communication rate, such that if the common supported communication rate is 1 Mbps, the communication rate corresponding to the common supported communication rate may include any communication rate between and including 900 bps and 1.1 Mbps. For example, the margin of error may be greater than or less than ten percent.

At 330, the computing device (e.g., the network device 104) may receive a second request (e.g., an authentication request). For example, the second request may comprise the fourth communication frame 204 (e.g., a management frame, such as the authentication request frame). The second request may be received from a second computing device (e.g., the user device 102). For example, the second request may be sent from the user device 102 to the network device 104 at one of the supported communication rates (e.g., the requested data communication rate, such as the requested beacon data communication rate) of the user device 102. The second request (e.g., the fourth communication frame 204) may be received based on the network device 104 sending the response (e.g., the third communication frame 203) to the user device 102.

The fourth communication frame 204 may comprise a MAC header, frame body, and FCS. The MAC header of the fourth communication frame 204 may comprise the source of the second request (e.g., an identifier of the user device 102, such as a user device ID, user device name, or MAC address of the user device 102) and a destination of the second request (e.g., an identifier of the network device 104, such as a network device ID, network device name, or MAC address of the network device 104). The body of the fourth communication frame 204 may comprise an authentication algorithm number (indicating if it is an open system or shared key network), a transaction number (indicating the number of transactions between the user device 102 and the network device 104), a status code (indicating success or failure of the authentication) and channel text (which may be used for shared key authentication). In a shared key authentication, the challenge text of the second request may also comprise a shared key or password. The second request may be sent from the user device 102 to the network device 104 at or substantially equal to the common supported communication rate (e.g., the lowest common supported communication rate and/or the requested data communication rate (e.g., the requested beacon data communication rate) of the user device 102).

At 335, the computing device (e.g., the network device 104) may generate and/or send a second response (e.g., an authentication response). The second response may comprise the fifth communication frame 205 (e.g., a management frame, such as the second response frame or authentication response frame). For example, the second response may be sent from the network device 104 to the user device 102 at the communication rate corresponding to one of the supported communication rates (e.g., the requested data communication rate, such as the requested beacon data communication rate) of the user device 102. For example, the communication rate corresponding to the one of the supported communication rates (e.g., the requested data communication rate, such as the requested beacon data communication rate) may comprise the one of the supported communication rates and a margin of error above and below the one of the supported communication rates. For example, the margin of error may be ten percent of the one of the supported communication rates, such that if the one of the supported communication rates is 1 Mbps, the communication rate corresponding to the one of the supported communication rates may include any communication rate between and including 900 bps and 1.1 Mbps. For example, the margin of error may be greater than or less than ten percent. For example, the second response may be sent by the network device 104 using the second communication protocol. The second response (e.g., the fifth communication frame 205) may be sent based on the network device 104 receiving the second request (e.g., the fourth communication frame 204) from the user device 102.

The fifth communication frame 205 may comprise a MAC header, frame body, and FCS. The MAC header of the fifth communication frame 205 may comprise a source of the second response (e.g., an identifier of the network device 104, such as a network device ID, network device name, or MAC address of the network device 104) and a destination of the second response (e.g., an identifier of the user device 102, such as a user device ID, user device name, or MAC address of the user device 102). The body of the fifth communication frame 205 may comprise an authentication algorithm number (indicating if it is an open system or shared key network), a transaction number (indicating the number of transactions between the user device 102 and the network device 104), and a status code (indicating success or failure of the authentication).

The second response may be sent from the network device 104 to the user device 102 at the communication rate corresponding to the common supported communication rate (e.g., the lowest common supported communication rate and/or the requested data communication rate (e.g., the requested beacon data communication rate) of the user device 102). For example, the communication rate corresponding to the common supported communication rate (e.g., the lowest common supported communication rate and/or the requested data communication rate, such as the requested beacon data communication rate) may comprise the common supported communication rate and a margin of error above and below the common supported communication rate. For example, the margin of error may be ten percent of the common supported communication rate, such that if the common supported communication rate is 1 Mbps, the communication rate corresponding to the common supported communication rate may include any communication rate between and including 900 bps and 1.1 Mbps. For example, the margin of error may be greater than or less than ten percent.

At 340, the computing device (e.g., the network device 104) may receive a third request (e.g., an association request). For example, the third request may comprise the sixth communication frame 206 (e.g., a management frame, such as the association request frame). The third request may be received from a second computing device (e.g., the user device 102). For example, the third request may be sent from the user device 102 to the network device 104 at or substantially equal to one of the supported communication rates (e.g., the requested data communication rate, such as the requested beacon data communication rate) of the user device 102. The third request (e.g., the sixth communication frame 206) may be received based on the network device 104 sending the second response (e.g., the fifth communication frame 205) to the user device 102.

The sixth communication frame 206 may comprise a MAC header, frame body, and FCS. The MAC header of the sixth communication frame 206 may comprise the source of the third request (e.g., an identifier of the user device 102, such as a user device ID, user device name, or MAC address of the user device 102) and a destination of the third request (e.g., an identifier of the network device 104, such as a network device ID, network device name, or MAC address of the network device 104). The body of the sixth communication frame 206 may comprise network capability information for the user device 102 (e.g., the type of network that the user device 102 wants to join with), a listening interval (e.g., how often the user device 102 listens to first communication frames in order to monitor the traffic indication map), a network name (e.g., SSID) of the network to be joined (e.g., the network 101) and supported communication rates (e.g., the requested data communication rate, such as the requested beacon data communication rate) for the user device 102. The third request may be sent from the user device 102 to the network device 104 at or substantially equal to the common supported communication rate (e.g., the lowest common supported communication rate and/or the requested data communication rate (e.g., the requested beacon data communication rate) of the user device 102).

At 345, the computing device (e.g., the network device 104) may generate and send a third response (e.g., an association response). The third response may comprise the sixth communication frame 207 (e.g., a management frame, such as the third response frame or association response frame). For example, the third response may be sent from the network device 104 to the user device 102 at the communication rate corresponding to one of the supported communication rates (e.g., the requested data communication rate, such as the requested beacon data communication rate) of the user device 102. For example, the third response may be sent by the network device 104 using the second communication protocol. The third response (e.g., the seventh communication frame 207) may be sent based on the network device 104 receiving the third request (e.g., the sixth communication frame 206) from the user device 102.

The seventh communication frame 207 may comprise a MAC header, frame body, and FCS. The MAC header of the seventh communication frame 207 may comprise the source of the third response (e.g., an identifier of the network device 104, such as a network device ID, network device name, or MAC address of the network device 104) and a destination of the third response (e.g., an identifier of the user device 102, such as a user device ID, user device name, or MAC address of the user device 102). The body of the seventh communication frame 207 may comprise network capability information for the network device 102, a status code (indicating the success or failure of the user device's connection to the network), an association identifier (e.g., an identifier assigned by the network device 104 to the user device 102 and used by the network device 104 to monitor the connection status of the user device 102 to the network), and supported communication rates (e.g., the advertised data communication rates, such as the advertised beacon data communication rates) for the network device 104 under the second communication protocol. The third response may be sent from the network device 104 to the user device 102 at the communication rate corresponding to the common supported communication rate (e.g., the lowest common supported communication rate and/or the requested data communication rate (e.g., the requested beacon data communication rate) of the user device 102).

At 350, a connection may be established and a communication session (e.g., the communication session 208) initiated between the computing device (e.g., the network device 104) and the second computing device (e.g., the user device 102). The communication session may be initiated in response to a success indication in the third response (e.g., the seventh communication frame 207). As part of the communication session 208, the user device 102 may send or otherwise transmit requests for content via the network device 104 to other devices and may receive content via the network device 104 from other devices communicating with the network (e.g., network 101). For example, the network device 104 may communicate with the user device 102 during the communication session using the second communication protocol.

At 355, the computing device (e.g., the network device 104) may optionally determine if the second computing device (e.g., the user device 102) has ended its communication session and/or disconnected from the network (e.g., network 101). When a communication session begins with the user device 102, the network device 104 may initiate a clock/timer 107. The clock/timer 107 may be set for a predetermined amount of time and that time may be configurable based on the desired parameters of the user. When the preset time has been reached or expired, the network device 104 may determine if the user device 102 is still conducting a communication session through the network device 104 to the network (e.g., network 101). For example, the network device 104 may evaluate an array table of communication sessions to determine if the user device 102 is still in a communication session with the network device 104. For example, the evaluation of the array table may be based on the clock/timer 107 reaching the preset time or expiring. For example, the clock/timer 107 may reset after each interaction by the network device 104 with the user device 102. The network device 104 may determine if the network device 104 has received a disassociation request from the user device 102. For example, receipt of the disassociation request may end the communication session between the network device 104 and the user device 102.

If the communication session between the network device 104 and the user device 102 has not completed and/or the user device 102 is still connected to the network device, the NO branch may be followed to 355. For example, the clock/timer 107 may be reset and the network device 104 may wait until the clock/timer 107 reaches the next preset time or the timer expires. For example, the network device 104 may continue to wait for a disassociation request from the user device 102. If the communication session between the network device 104 and the user device 102 has completed and the user device 102 is disconnected from the network device 104, the YES branch may be followed to 360.

At 360, the network device 104 may optionally determine, for the network device 104 to use the first communication protocol. For example, the network device 104 may determine to use the first communication protocol for subsequent communications with other computing devices. For example, the network device 104 may determine to communicate with the other computing devices using the first communication protocol at a communication rate higher than the communication rate corresponding to the one of the supported communication rates (e.g., the requested data communication rate, such as the requested beacon data communication rate) of the user device 102. For example, the second communication protocol may be an older communication protocol than the first communication protocol.

For example, each of the first communication protocol and the second communication protocol may be a wireless communication protocol. For example, the first communication protocol may be at least one of 802.11, 802.11a, 802.11b, 802.11g, 802.11n, 802.11ac, 802.11ax, Bluetooth, Zigbee, or Z-Wave. For example, the second communication protocol may be at least one of 802.11, 802.11a, 802.11b, 802.11g, 802.11n, 802.11ac, 802.11ax, Bluetooth, Zigbee, or Z-Wave. For example, the first communication protocol may be at least one of 802.11ac or 802.11ax and the second communication protocol may be at least one of 802.11b, 802.11g, or 802.11n.

Figure 4:
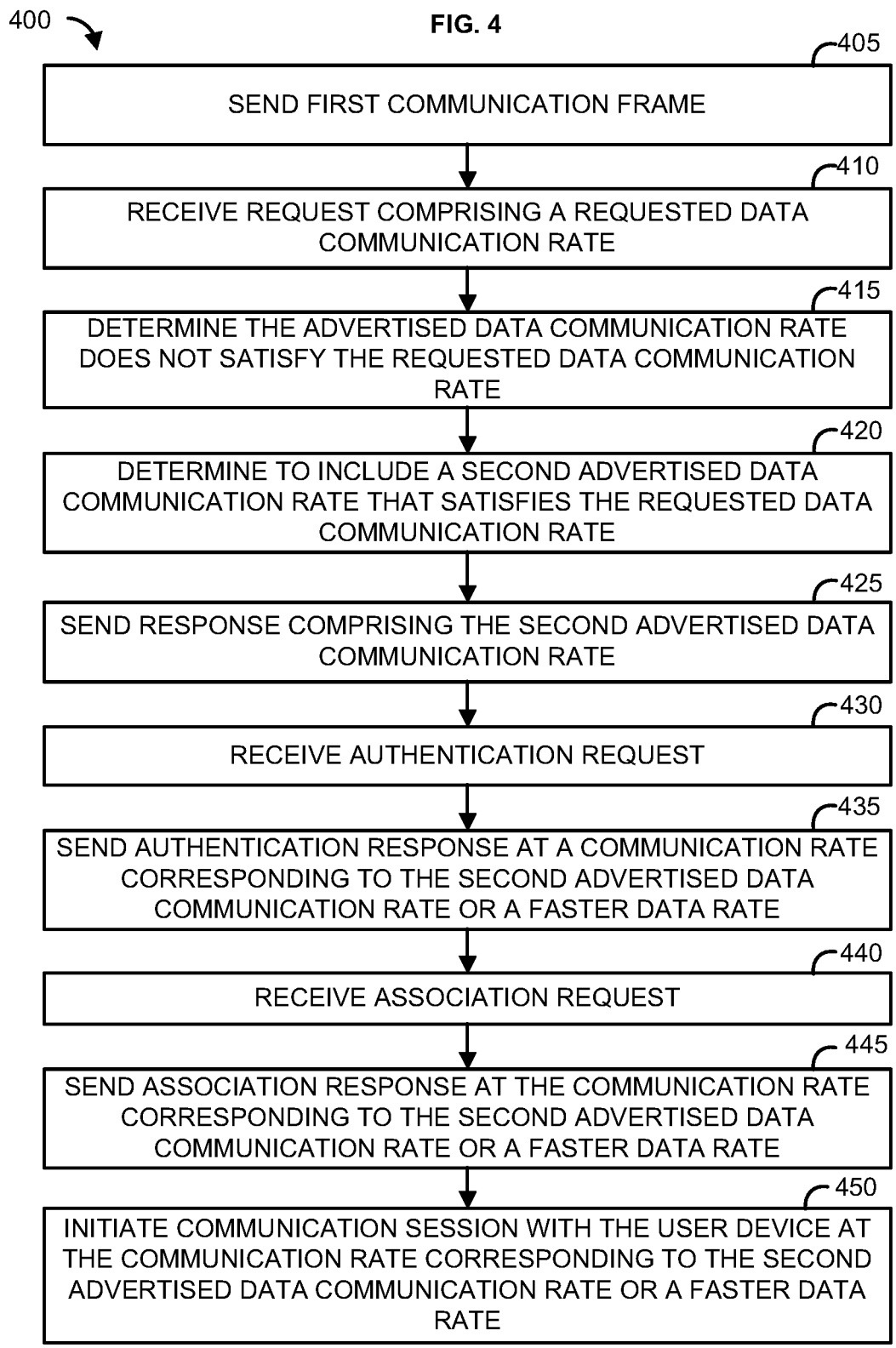
FIG. 4 shows a flowchart of another example method for managing a communication session.

FIG. 4 is a flowchart showing an example method 400 for managing a communication session. The management of a communication session may occur between a computing device (e.g., a network device 104) and a second computing device (e.g., a user device 102). The user device 102 may be at least one of a client device, a personal computer, computing station, workstation, portable computer, laptop computer, mobile phone, tablet device, smartphone, smartwatch, activity tracker, smart apparel, smart accessory, security and/or monitoring device, a mobile device, a game system, a content output device, or an IoT device. The network device 104 may be at least one of a wireless router, a gateway, an access point, or a node.

At 405, a computing device (e.g., the network device 104) may send or otherwise transmit a first communication frame (e.g., the first communication frame 201). For example, the first communication frame may comprise a management frame, such as a beacon frame. The first communication frame may be configured for communication using one or more communication protocols. For example, the communication protocol may be at least one of 802.11, 802.11a, 802.11b, 802.11g, 802.11n, 802.11ac, 802.11ax, Bluetooth, Zigbee, or Z-Wave. The first communication frame 201 may comprise information about the network (e.g., the network 101). The first communication frame 201 may be sent or otherwise transmitted periodically by the network device 104. For example, the first communication frame 201 may be sent at a preset time period or at a defined or adjustable interval. The first communication frame 201 may be configured to announce the presence of a network device (e.g., the network device 104) to other devices (e.g., the user device 102) in an area. The first communication frame 201 may also be configured to synchronize the members of the service set within the network (e.g., the network 101).

The first communication frame 201 may comprise a MAC header (e.g., an 802.11 MAC header), a body, and a FCS. The body of the first communication frame 201 may comprise a timestamp, a beacon interval, network capability information, a network name (e.g., a SSID), encryption capabilities of the network, supported communication rates (e.g., at least one advertised data communication rate, such as an advertised beacon data communication rate), a frequency-hopping parameter set, a direct-sequence parameter set, a contention-free parameter set, an IBSS parameter set, and/or a traffic indication map. The network capability information may comprise the capabilities of the advertised network (e.g., the network 101) and/or the type (e.g., ad hoc, infrastructure, etc.) of the advertised network.

At 410, the computing device (e.g., the network device 104) may receive a request (e.g., a probe request). For example, a second computing device (e.g., the user device 102) may generate and send or otherwise transmit the request. The request may comprise a second communication frame 202. For example, the second communication frame may comprise a management frame, such as a probe request frame. The second communication frame 202 may be configured to identify networks (e.g., the network 101) within a proximity or within communication range of the user device 102. The second communication frame 202 may be sent from the user device 102 to a specific computing device (e.g., the network device 104) or may be sent (e.g., broadcast) by the user device 102 for receipt by any computing device (e.g., any network device) within communication range of the user device 102.

The second communication frame 202 may comprise a MAC header (e.g., an 802.11 MAC header), a body, and an FCS. The second communication frame 202 may comprise an identifier of the user device 102 (e.g., a device name, a device ID, a MAC address for the user device 102), a network name (e.g., SSID), one or more supported communication rates (e.g., the requested data communication rate, such as the requested beacon data communication rate or other communication rates), one or more supported communication protocols (e.g., 802.11, 802.11a, 802.11b, 802.11g, 802.11n, 802.11ac, 802.11ax, Bluetooth, Zigbee, Z-Wave, etc.), desired network capabilities, encryption capabilities of the user device 102, and channel usage. For example, the requested data communication rate (e.g., the requested beacon data communication rate) may be a maximum data communication rate at which the user device 102 will initiate a communication session with a network device 104. However, once the communication session is initiated with the network device 104, the user device 102 may communicate with the network device 104 at a data communication rate that is greater than the requested data communication rate. The user device 102 may initiate a timer when the request is sent. If the timer runs out or reaches a predetermined time period, the user device 102 may cease waiting for a response or any additional responses from a network device (e.g., network device 104).

At 415, the computing device (e.g., the network device 104) may determine the first advertised data communication rate (e.g., the first advertised beacon data communication rate) does not satisfy (e.g., equal) the requested data communication rate (e.g., the requested beacon data communication rate) of the second computing device (e.g., the user device 102). For example, the network device 104 may determine that it is unable to communicate with the user device 102 at the requested data communication rate (e.g., the requested beacon data communication rate). For example, the network device 104 may determine the one or more supported communication rates (e.g., the requested data communication rate, such as the requested beacon data communication rate) provided in the request. The network device 104 may compare the one or more supported communication rates (e.g., the requested data communication rate, such as the requested beacon data communication rate) of the user device 102 to the one or more supported communication rates of the network device 104 (e.g., the first advertised data communication rate, such as the first advertised beacon data communication rate). For example, the first advertised data communication rate (e.g., the first advertised beacon data communication rate) may be a minimum data communication rate at which the network device 104 will initiate a communication session with a user device 102. For example, the first advertised data communication rate may be a basic communication rate of the 802.11 protocol. The network device 104 may determine that none of the one or more supported communication rates for the network device 104 (e.g., the first advertised data communication rate, such as the first advertised beacon data communication rate) satisfies (e.g., equals or matches) at least one of the one or more of the supported communication rates (e.g., the requested data communication rate, such as the requested beacon data communication rate) for the user device 102. For example, the network device 104 may determine that, as currently configured, the slowest supported communication rate for the network device 104 (e.g., the first advertised data communication rate, such as the first advertised beacon data communication rate) is faster than the fastest supported communication rate (e.g., the requested data communication rate, such as the requested beacon data communication rate) of the user device 102. For example, the second communication frame 202 may list supported communication rates (e.g., the requested data communication rate, such as the requested beacon data communication rate) of 1 Mbps for the user device 102 and the network device 104 may have supported communication rates (e.g., first advertised data communication rate, such as the first advertised beacon data communication rate) of 6 Mbps, 24 Mbps, and 48 Mbps. In this example, the slowest supported communication rate (e.g., the first advertised data communication rate) for the network device 104 of 6 Mbps is faster than the supported communication rate (e.g., the requested data communication rate, such as the requested beacon data communication rate) of 1 Mbps for the user device 102.

For example, the network device 104 may determine that the fastest supported communication rate for the network device 104 (e.g., the first advertised data communication rate, such as the first advertised beacon data communication rate) is slower than the slowest supported communication rate (e.g., the requested data communication rate, such as the requested beacon data communication rate) of the user device 102. For example, the second communication frame 202 may list supported communication rates (e.g., the requested data communication rate, such as the requested beacon data communication rate) of 24 Mbps for the user device 102 and the network device 104 may have supported communication rates (e.g., the first advertised data communication rate, such as the first advertised beacon data communication rate) of 1 Mbps and 6 Mbps. In this example, the fastest supported communication rate (e.g., the first advertised data communication rate) for the network device 104 of 6 Mbps is slower than the supported communication rate (e.g., the requested data communication rate) of 24 Mbps for the user device 102.

At 420, the computing device (e.g., the network device 104) may determine to include (e.g., adjust, add, or otherwise modify), in the supported communication rates for the network device 104, a second advertised data communication rate (e.g., a second advertised beacon data communication rate) for the network device 104 that satisfies (e.g., equals or matches) one of the supported communication rates (e.g., the requested data communication rate, such as the requested beacon data communication rate) for the user device 102 in the request. For example, the network device 104 may include (e.g., adjust, add, or modify) the second advertised data communication rate for the network device 104 that is less than all of the original supported communication rates for the network device 104 in the adjusted supported communication rates for the network device 104. For example, the network device 104 may determine to include (e.g., adjust, add, or modify) the second advertised data communication rate for the network device 104 that satisfies (e.g., equals or matches) the highest supported communication rate (e.g., the requested data communication rate, such as the requested beacon data communication rate) for the user device 102 in the request. For example, the network device 104 may modify or adjust one of the initial or original supported communication rates (e.g., the first advertised data communication rate) for the network device 104 to be (e.g., equal) the second advertised data communication rate in a list of adjusted supported communication rates for the network device 104.

For example, the network device may determine to include (e.g., adjust, add, or modify) the second advertised data communication rate for the network device 104 that is greater than all of the original supported communication rates (e.g., the first advertised data communication rate, such as the first advertised beacon data communication rate) for the network device 104 in the list of adjusted supported communication rates for the network device 104. For example, the network device 104 may determine to include (e.g., adjust, add, or modify) the second advertised data communication rate that satisfies (e.g., equals or matches) the slowest supported communication rate (e.g., the requested data communication rate, such as the requested beacon data communication rate) for the user device 102 in the request, in the list of adjusted supported communication rates for the network device 104 For example, the network device 104 may modify or adjust one of the initial or original supported communication rates (e.g., the first advertised data communication rate) for the network device 104 to be (e.g., equal) the second advertised data communication rate in the list of adjusted supported communication rates for the network device 104.

At 425, the computing device (e.g., the network device 104) may generate and/or send a response (e.g., a probe response) that comprises the second advertised beacon data communication rate in the list of adjusted supported communication rates for the network device 104. For example, the response may comprise a third communication frame 203 (e.g., a management frame, such as a response frame or a probe response frame). For example, the response (e.g., the third communication frame 203) may comprise the second advertised data communication rate (e.g., the second advertised beacon data communication rate) in the listing of adjusted supported communication rates in the supported communication rates field of the third communication frame 203.

For example, the response may be sent from the network device 104 to the user device 102 at a communication rate corresponding to the second advertised data communication rate (e.g., the second advertised beacon data communication rate) that satisfies (e.g., equals or matches) one of the supported communication rates (e.g., the requested data communication rate, such as the requested beacon data communication rate) of the user device 102. For example, the communication rate corresponding to the second advertised data communication rate may comprise the second advertised data communication rate (e.g., the second advertised beacon data communication rate) and a margin of error above and below the second advertised data communication rate. For example, the margin of error may be ten percent of the second advertised data communication rate, such that if the second advertised data communication rate (e.g., the second advertised beacon data communication rate) is 1 Mbps, the communication rate corresponding to the second advertised communication rate may include any communication rate between and including 900 bps and 1.1 Mbps. For example, the margin of error may be greater than or less than ten percent. The response (e.g., the third communication frame 203) may be sent based on the network device 104 receiving the request (e.g., the second communication frame 202) from the user device 102.

The third communication frame 203 may comprise a MAC header (e.g., an 802.11 MAC header), a body, and an FCS. The third communication frame 203 may comprise a timestamp, a beacon interval, network capability information, a network name (e.g., SSID), encryption capabilities of the network, supported communication rates (e.g., including the second advertised data communication rate for the network device 104), a frequency-hopping parameter set, a direct-sequence parameter set, a contention-free parameter set, an IBSS parameter set, capacity information, channel availability, and/or a traffic indication map. The network capability information may comprise the capabilities of the advertised network (e.g., the network 101) and/or the type (e.g., ad hoc, infrastructure, etc.) of the advertised network.

For example, the third communication frame 203 may be sent to the user device 102 at a communication rate corresponding to the common supported communication rate (e.g., the lowest common supported communication rate) of the user device 102 and the network device 104 created by determining to include the second advertised data communication rate in a list of adjusted supported communication rates for the network device 104. Initially communicating at the lower communication rate allows for a lower modulation rate and a higher gain, which may allow for a greater communication range for the network device 104 and/or the user device 102. Once a communication session is established between the user device 102 and the network device 104, the network device 104 may send a subsequent packet with additional communication rates for communicating with the user device 102. These additional communication rates may be much faster than the initial common supported communication rate (e.g., the lowest common supported communication rate, such as the beacon data communication) at which the user device 102 and network device 104 first communicated. For example, if the request (e.g., second communication frame 202) lists supported communication rates (e.g., the requested data communication rate, such as the requested beacon data communication rate) of 500 kbps and 1 Mbps for the user device 102 and the response (e.g., third communication frame 203) lists adjusted supported communication rates (e.g., the advertised data communication rates, such as the advertised beacon data communication rates) of 1 Mbps (e.g., the second advertised data communication rate), 5.5 Mbps, 24 Mbps, and 48 Mbps, then the common supported communication rate (and the lowest common supported communication rate) would be 1 Mbps. The response (e.g., the probe response) may be sent from the network device 104 to the user device 102 at a communication rate corresponding to the common supported communication rate (e.g., the lowest common supported communication rate, the second advertised data communication rate, and/or the requested data communication rate of the user device 102). For example, the communication rate corresponding to the common supported communication rate (e.g., the lowest common supported communication rate, the second advertised data communication rate, and/or the requested data communication rate) may comprise the common supported communication rate and a margin of error above and below the common supported communication rate. For example, the margin of error may be ten percent of the common supported communication rate, such that if the common supported communication rate is 1 Mbps, the communication rate corresponding to the common supported communication rate may include any communication rate between and including 900 bps and 1.1 Mbps. For example, the margin of error may be greater than or less than ten percent.

At 430, the computing device (e.g., the network device 104) may receive a second request (e.g., the authentication request). For example, the second request may comprise the fourth communication frame 204 (e.g., a management frame, such as the authentication request frame). The second request may be received from a second computing device (e.g., the user device 102). For example, the second request may be sent from the user device 102 to the network device 104 at the communication rate corresponding to the second advertised data communication rate (e.g., the second advertised beacon data communication rate) that satisfies (e.g., equals or matches) one of the supported communication rates (e.g., the requested data communication rate, such as the requested beacon data communication rate) of the user device 102. The second request (e.g., the fourth communication frame 204) may be received based on the network device 104 sending the response (e.g., the third communication frame 203) to the user device 102.

The fourth communication frame 204 may comprise a MAC header, frame body, and FCS. The MAC header of the fourth communication frame 204 may comprise the source of the second request (e.g., an identifier of the user device 102, such as a user device ID, user device name, or MAC address of the user device 102) and a destination of the second request (e.g., an identifier of the network device 104, such as a network device ID, network device name, or MAC address of the network device 104). The body of the fourth communication frame 204 may comprise an authentication algorithm number (indicating if it is an open system or shared key network), a transaction number (indicating the number of transactions between the user device 102 and the network device 104), a status code (indicating success or failure of the authentication) and channel text (which may be used for shared key authentication). In a shared key authentication, the challenge text of the second request may also comprise a shared key or password. The second request may be sent from the user device 102 to the network device 104 at the communication rate corresponding to the common supported communication rate (e.g., the lowest common supported communication rate, the second advertised data communication rate and/or the requested data communication rate) of the user device 102 and the network device 104

At 435, the computing device (e.g., the network device 104) may generate and/or send a second response (e.g., an authentication response). The second response may comprise the fifth communication frame 205 (e.g., a management frame, such as the second response frame or authentication response frame). For example, the second response may be sent from the network device 104 to the user device 102 at a communication rate corresponding to one of the adjusted supported communication rates (e.g., the second advertised data communication rate, such as the second advertised beacon data communication rate) of the network device 104. For example, the communication rate corresponding to the one of the adjusted supported communication rates (e.g., the second advertised data communication rate, such as the second advertised beacon data communication rate) may comprise the one of the second advertised data communication rate and a margin of error above and below the second advertised data communication rate. For example, the margin of error may be ten percent of the second advertised data communication rate, such that if the second advertised data communication rate is 1 Mbps, the communication rate corresponding to the second advertised data communication rate may include any communication rate between and including 900 bps and 1.1 Mbps. For example, the margin of error may be greater than or less than ten percent.

For example, the second response may be sent from the network device 104 to the user device 102 at a communication rate corresponding to another communication rate that is greater than the second advertised data communication rate (e.g., the second advertised beacon data communication rate). For example, the second response may be sent from the network device 104 to the user device 102 at a communication rate corresponding to a rate that is between the second advertised data communication rate of the network device 104 and one of the original supported communication rates (e.g., the first advertised beacon data communication rate, such as the slowest original supported communication rate) of the network device 104. For example, each subsequent response sent by the network device 104 to the user device 102 may be at a communication rate faster than the second advertised data communication rate for the network device 104 and/or may be sent at a communication rate that is faster than the communication rate of the immediately prior response sent by the network device 104 (e.g., a progressive ramp up in communication rates used for responses sent by the network device 104 to the user device 102). The ramp up or increase in communication rates used for responses may continue until the slowest original supported communication rate (e.g., the first advertised data communication rate) is reached or until another communication rate is reached that is greater than the slowest original supported communication rate for the network device 104.

The second response (e.g., the fifth communication frame 205) may be sent based on the network device 104 receiving the second request (e.g., the fourth communication frame 204) from the user device 102.

The fifth communication frame 205 may comprise a MAC header, frame body, and FCS. The MAC header of the fifth communication frame 205 may comprise a source of the second response (e.g., an identifier of the network device 104, such as a network device ID, network device name, or MAC address of the network device 104) and a destination of the second response (e.g., an identifier of the user device 102, such as a user device ID, user device name, or MAC address of the user device 102). The body of the fifth communication frame 205 may comprise an authentication algorithm number (indicating if it is an open system or shared key network), a transaction number (indicating the number of transactions between the user device 102 and the network device 104), and a status code (indicating success or failure of the authentication).

For example, the second response may be sent from the network device 104 to the user device 102 at a communication rate corresponding to an adjusted supported communication rate (e.g., an advertised data communication rate) for the network device 104 or at another communication rate that does not satisfy (e.g., equal) a supported communication rate (e.g., the requested data communication rate, such as the requested beacon data communication rate) for the user device 102 and is less than or greater than the second advertised data communication rate for the network device 104.

At 440, the computing device (e.g., the network device 104) may receive a third request (e.g., an association request). For example, the third request may comprise the sixth communication frame 206 (e.g., a management frame, such as the association request frame). The third request may be received from a second computing device (e.g., the user device 102). For example, the third request may be sent from the user device 102 to the network device 104 at a communication rate corresponding to the second advertised data communication rate that satisfies (e.g., equals) one of the supported communication rates (e.g., the requested data communication rate, such as the requested beacon data communication rate) of the user device 102, or a communication rate greater than the second advertised data communication rate (e.g., the first advertised data communication rate or a communication rate between the first and second advertised data communication rates for the network device 104). The third request (e.g., the sixth communication frame 206) may be received based on the network device 104 sending the second response (e.g., the fifth communication frame 205) to the user device 102.

The sixth communication frame 206 may comprise a MAC header, frame body, and FCS. The MAC header of the sixth communication frame 206 may comprise the source of the third request (e.g., an identifier of the user device 102, such as a user device ID, user device name, or MAC address of the user device 102) and a destination of the third request (e.g., an identifier of the network device 104, such as a network device ID, network device name, or MAC address of the network device 104). The body of the sixth communication frame 206 may comprise network capability information for the user device 102 (e.g., the type of network that the user device 102 wants to join with), a listening interval (e.g., how often the user device 102 listens to first communication frames in order to monitor the traffic indication map), a network name (e.g., SSID) of the network to be joined (e.g., the network 101) and supported communication rates (e.g., the requested data communication rates, such as the requested beacon data communication rates) for the user device 102. For example, the third request may be sent from the user device 102 to the network device 104 at a communication rate corresponding to the common supported communication rate (e.g., the lowest common supported communication rate and/or the requested data communication rate for the user device 102 and/or the second advertised data communication rate for the network device 104). For example, the third request may be send from the user device 102 to the network device 104 at a communication rate corresponding to a communication rate greater than the common supported communication rate.

At 445, the computing device (e.g., the network device 104) may generate and/or send a third response (e.g., an association response). The third response may comprise the seventh communication frame 207 (e.g., a management frame, such as the third response frame or association response frame). For example, the third response may be sent from the network device 104 to the user device 102. For example, the third response may be sent at a communication rate corresponding to one of the adjusted supported communication rates (e.g., the second advertised data communication rate, such as the second advertised beacon data communication rate) of the network device 104 or another communication rate (e.g., the first advertised data communication rate) for the network device 104 that is greater than the second advertised data communication rate. For example, the communication rate corresponding to the one of the adjusted supported communication rates (e.g., the second advertised data communication rate, such as the second advertised beacon data communication rate) may comprise the one of the second advertised data communication rate and a margin of error above and below the second advertised data communication rate. For example, the margin of error may be ten percent of the second advertised data communication rate, such that if the second advertised data communication rate is 1 Mbps, the communication rate corresponding to the second advertised data communication rate may include any communication rate between and including 900 bps and 1.1 Mbps. For example, the margin of error may be greater than or less than ten percent.

For example, the third response may be sent from the network device 104 to the user device 102 at a communication rate corresponding to a communication rate that is greater than the second advertised data communication rate, the requested data communication rate, and/or the communication rate that the second response was sent from the network device 104 to the user device 102. For example, the third response may be sent from the network device 104 to the user device 102 at another supported communication rate (e.g., the first advertised data communication rate) for the network device 104. For example, the second response may be sent from the network device 104 to the user device 102 at a communication rate corresponding to a communication rate that is between the communication rate of the second response and one of the original supported communication rates (e.g., the first advertised beacon data communication rate, such as the slowest original supported communication rate) of the network device 104. For example, each subsequent response sent by the network device 104 to the user device 102 may be at a communication rate faster than the communication rate for the third response and/or may be sent at a communication rate that is faster than the communication rate of the immediately prior response sent by the network device 104 (e.g., a progressive ramp up in communication rates used for responses sent by the network device 104 to the user device 102). The ramp up or increase in communication rates used for responses may continue until the slowest original supported communication rate (e.g., the first advertised data communication rate) is reached or until another communication rate is reached that is greater than the slowest original supported communication rate for the network device 104.

The third response (e.g., the seventh communication frame 207) may be sent based on the network device 104 receiving the third request (e.g., the sixth communication frame 206) from the user device 102. The seventh communication frame 207 may comprise a MAC header, frame body, and FCS. The MAC header of the seventh communication frame 207 may comprise the source of the third response (e.g., an identifier of the network device 104, such as a network device ID, network device name, or MAC address of the network device 104) and a destination of the third response (e.g., an identifier of the user device 102, such as a user device ID, user device name, or MAC address of the user device 102). The body of the seventh communication frame 207 may comprise network capability information for the network device 102, a status code (indicating the success or failure of the user device's connection to the network), an association identifier (e.g., an identifier assigned by the network device 104 to the user device 102 and used by the network device 104 to monitor the connection status of the user device 102 to the network), and the adjusted supported communication rates (e.g., the advertised data communication rates, such as the second advertised data communication rate) for the network device 104.

The third response may be sent from the network device 104 to the user device 102 at a supported communication rate (e.g., an advertised beacon data communication rate) that does not satisfy (e.g., equal) a supported communication rate (e.g., the requested data communication rate, such as the requested beacon data communication rate) for the user device and is less than or greater than the second advertised data communication rate for the network device 104.

At 450, a connection may be established and a communication session (e.g., the communication session 208) initiated between the computing device (e.g., the network device 104) and the second computing device (e.g., the user device 102). The communication session may be initiated in response to a success indication in the third response (e.g., the seventh communication frame 207). As part of the communication session 208, the user device 102 may send or otherwise transmit requests for content via the network device 104 to other devices and may receive content via the network device 104 from other devices communicating with the network (e.g., network 101). For example, the network device 104 may communicate with the user device 102 during the communication session at a communication rate faster than the supported communication rates (e.g., the requested data communication rate, such as the requested beacon data communication rate) of the user device 102. For example, the network device 104 may communicate with the user device 102 during the communication session at a communication rate faster than the communication rate of the response, second response, and/or third response sent from the network device 104 to the user device 102. For example, the network device 104 may communicate with the user device 102 during the communication session at a communication rate faster than the second advertised data communication rate of the network device 104. For example, the network device 104 may communicate with the user device 102 during the communication session at a communication rate that is slower than the second advertised data communication rate.

Figure 5:
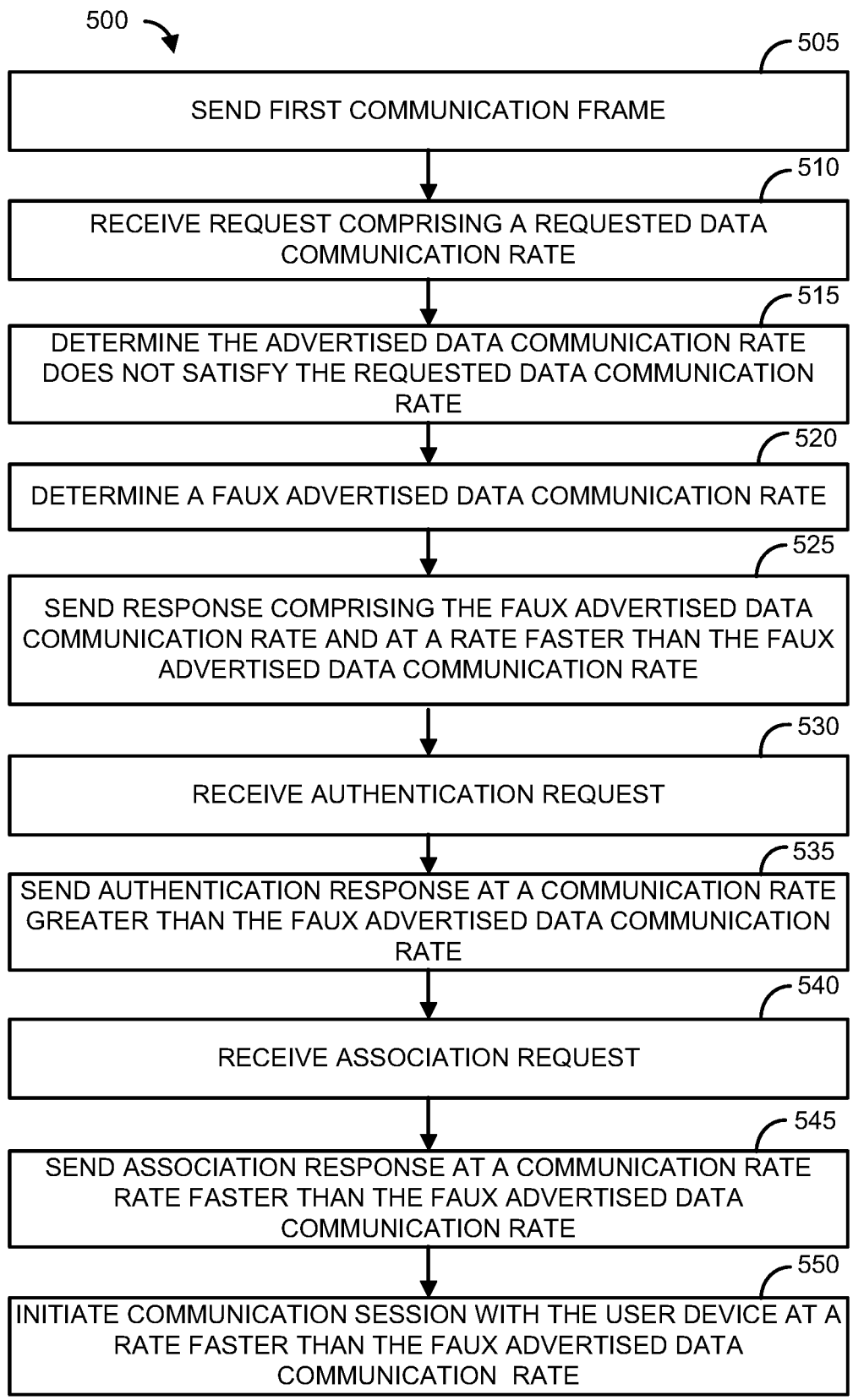
FIG. 5 shows a flowchart of another example method for managing a communication session.

FIG. 5 is a flowchart showing an example method 500 for managing a communication session. The management of a communication session may occur between a computing device (e.g., a network device 104) and a second computing device (e.g., a user device 102). The user device 102 may be at least one of a client device, a personal computer, computing station, workstation, portable computer, laptop computer, mobile phone, tablet device, smartphone, smartwatch, activity tracker, smart apparel, smart accessory, security and/or monitoring device, a mobile device, a game system, a content output device, or an IoT device. The network device 104 may be at least one of a wireless router, a gateway, an access point, or a node.

At 505, a computing device (e.g., the network device 104) may send or otherwise transmit a first communication frame (e.g., the first communication frame 201). For example, the first communication frame may comprise a management frame, such as a beacon frame. The first communication frame may be configured for communication per one or more communication protocols. For example, the communication protocol may be at least one of 802.11, 802.11a, 802.11b, 802.11g, 802.11n, 802.11ac, 802.11ax, Bluetooth, Zigbee, or Z-Wave. The first communication frame may contain information about the network (e.g., the network 101). The first communication frame may be sent or otherwise transmitted periodically by the network device 104. For example, the first communication frame may be sent at a preset time period or at a defined or adjustable interval. The first communication frame 201 may be configured to announce the presence of a network device (e.g., the network device 104) to other devices (e.g., the user device 102) in an area (e.g., defined by a communication range of the network device 104). The first communication frame 201 may also be configured to synchronize the members of the service set within the network (e.g., the network 101).

The first communication frame 201 may comprise a MAC header (e.g., an 802.11 MAC header), a body, and a FCS. The body of the first communication frame 201 may comprise a timestamp, a beacon interval, network capability information, a network name (e.g., a SSID), encryption capabilities of the network, supported communication rates (e.g., at least one advertised data communication rate, such as an advertised beacon data communication rate), a frequency-hopping parameter set, a direct-sequence parameter set, a contention-free parameter set, an IBSS parameter set, and/or a traffic indication map. The network capability information may comprise the capabilities of the advertised network (e.g., the network 101) and/or the type (e.g., ad hoc, infrastructure, etc.) of the advertised network.

At 510, the computing device (e.g., the network device 104) may receive a request (e.g., a probe request). For example, a second computing device (e.g., the user device 102) may generate and send or otherwise transmit the request. The request may comprise a second communication frame 202. For example, the second communication frame 202 may comprise a management frame, such as a probe request frame. The second communication frame 202 may be configured to identify networks (e.g., the network 101) within a proximity or within communication range of the user device 102. The second communication frame 202 may be sent from the user device 102 to a specific computing device (e.g., the network device 104) or may be sent (e.g., broadcast) by the user device 102 for receipt by any computing device (e.g., any network device) within communication range of the user device 102.

The second communication frame 202 may comprise a MAC header (e.g., an 802.11 MAC header), a body, and an FCS. The second communication frame 202 may comprise an identifier of the user device 102 (e.g., a device name, a device ID, a MAC address for the user device 102), a network name (e.g., SSID), one or more supported communication rates (e.g., the requested data communication rate, such as the requested beacon data communication rate or other communication rates), one or more supported communication protocols (e.g., 802.11, 802.11a, 802.11b, 802.11g, 802.11n, 802.11ac, 802.11ax, Bluetooth, Zigbee, Z-Wave, etc.), desired network capabilities, encryption capabilities of the user device 102, and channel usage. For example, the requested data communication rate (e.g., the requested beacon data communication rate) may be a maximum data communication rate at which the user device 102 will initiate a communication session with a network device 104. However, once the communication session is initiated with the network device 104, the user device 102 may communicate with the network device 104 at a data communication rate that is greater than the requested data communication rate. The user device 102 may initiate a timer when the request is sent. If the timer runs out or reaches a predetermined time period, the user device 102 may cease waiting for a response or any additional responses from a network device (e.g., network device 104).

At 515, the computing device (e.g., the network device 104) may determine the advertised data communication rate (e.g., the advertised beacon data communication rate) does not satisfy (e.g., equal) the requested data communication rate (e.g., the requested beacon data communication rate) of the second computing device (e.g., the user device 102). For example, the network device 104 may determine the one or more supported communication rates (e.g., the requested data communication rate, such as the requested beacon data communication rate) provided in the request. The network device 104 may compare the one or more supported communication rates (e.g., the requested data communication rate, such as the requested beacon data communication rate) of the user device 102 to the one or more supported communication rates of the network device 104 (e.g., the first advertised data communication rate, such as the first advertised beacon data communication rate). For example, the first advertised data communication rate (e.g., the first advertised beacon data communication rate) may be a minimum data communication rate at which the network device 104 will initiate a communication session with a user device 102. For example, the advertised data communication rate may be a basic communication rate of the 802.11 protocol. The network device 104 may determine that none of the one or more supported communication rates for the network device 104 (e.g., the first advertised data communication rate, such as the first advertised beacon data communication rate) satisfies (e.g., equals or matches) at least one of the one or more of the supported communication rates (e.g., the requested data communication rate, such as the requested beacon data communication rate) for the user device 102. For example, the network device 104 may determine that, as currently configured, the slowest supported communication rate for the network device 104 (e.g., the first advertised data communication rate, such as the first advertised beacon data communication rate) is faster than the fastest supported communication rate (e.g., the requested data communication rate, such as the requested beacon data communication rate) of the user device 102. For example, the second communication frame 202 may list supported communication rates (e.g., the requested data communication rate, such as the requested beacon data communication rate) of 1 Mbps for the user device 102 and the network device 104 may have supported communication rates (e.g., first advertised data communication rate, such as the first advertised beacon data communication rate) of 6 Mbps, 24 Mbps, and 48 Mbps. In this example, the slowest supported communication rate (e.g., the first advertised data communication rate) for the network device 104 of 6 Mbps is faster than the supported communication rate (e.g., the requested data communication rate, such as the requested beacon data communication rate) of 1 Mbps for the user device 102.

For example, the network device 104 may determine that the fastest supported communication rate for the network device 104 (e.g., the first advertised data communication rate, such as the first advertised beacon data communication rate) is slower than the slowest supported communication rate (e.g., the requested data communication rate, such as the requested beacon data communication rate) of the user device 102. For example, the second communication frame 202 may list supported communication rates (e.g., the requested data communication rate, such as the requested beacon data communication rate) of 24 Mbps for the user device 102 and the network device 104 may have supported communication rates (e.g., the first advertised data communication rates, e.g., the first advertised beacon data communication rates) of 1 Mbps and 6 Mbps. In this example, the fastest supported communication rate (e.g., the first advertised data communication rate) for the network device 104 of 6 Mbps is slower than the supported communication rate (e.g., the requested data communication rate) of 24 Mbps for the user device 102.

At 520, the computing device (e.g., the network device 104) may determine and/or create a faux advertised data communication rate (e.g., a faux advertised beacon data communication rate). For example, the faux advertised data communication rate for the network device 104 may be determined to satisfy (e.g., equal) one of the supported communication rates (e.g., the requested data communication rate, such as the requested beacon data communication rate) for the user device 102. For example, the faux advertised data communication rate for the network device 104 may be determined to satisfy (e.g., equal) the fastest supported communication rate (e.g., the requested data communication rate, such as the requested beacon data communication rate) for the user device 102. For example, the faux advertised beacon data communication rate may be slower than all of the original supported communication rates (e.g., the first advertised data communication rate(s)) for the network device 104. For example, the network device 104 may adjust, add, or modify the supported communication rate (e.g., the first advertised beacon data communication rate) for the network device 104 to comprise the faux advertised data communication rate at a communication rate that satisfies (e.g., is equals to) the fastest supported communication rate (e.g., the requested data communication rate, such as the requested beacon data communication rate) for the user device 102 in the request.

For example, the faux advertised data communication rate may be faster than all of the original supported communication rates (e.g., the first advertised data communication rates) of the network device 104. For example, the network device 104 may adjust, add, or modify the supported communication rate(s) (e.g., the first advertised data communication rate) for the network device 104 to comprise the faux advertised beacon data communication rate at a communication rate that satisfies (e.g., is equal to) the slowest supported communication rate (e.g., the requested data communication rate, such as the requested beacon data communication rate) for the user device 102 in the request. For example, the faux advertised data communication rate may be a fake or false communication rate, in that the network device 104 is not currently configured to communication with other devices (e.g., the user device 102) at the faux advertised data communication rate (e.g., the faux advertised beacon data communication rate). The faux advertised beacon data communication rate may be determined and added to the list of supported communication rates for the network device 104 in an effort to initiate a communication session with another computing device (e.g., the user device 102) that does not have a supported communication rate that the network device 104 may currently satisfy as currently configured.

At 525, the computing device (e.g., the network device 104) may generate and/or send a response (e.g., a probe response). For example, the response may comprise a third communication frame 203 (e.g., a management frame, such as a response frame or a probe response frame). The response may comprise the faux advertised data communication rate (e.g., the faux advertised beacon data communication rate. For example, the response (e.g., the third communication frame 203) may comprise the faux advertised data communication rate in a listing of supported communication rates in the supported communication rates field of the response.

For example, the response may be sent from the network device 104 to the user device 102 at a communication rate corresponding to one of the supported communication rates (e.g., one of the advertised data communication rates, such as the slowest advertised data communication rate or another rate) for the network device 104 other than the faux advertised data communication rate. For example, the response may not be sent by the network device 104 to the user device 102 at the faux advertised data communication rate) even though the faux advertised data communication rate may be included in the listing of supported communication rates for the network device 104 and may satisfy (e.g., equal) a supported communication rate (e.g., the requested data communication rate, such as the requested beacon data communication rate) of the user device 102.

For example, the response may be sent from the network device 104 to the user device 102 at a communication rate corresponding to one of the advertised data communication rates, other than the faux advertised data communication rate, (e.g., one of the advertised beacon data communication rates) that does not satisfy (e.g., equal or match) one of the supported communication rates (e.g., the requested data communication rate, such as the requested beacon data communication rate) of the user device 102. For example, the communication rate corresponding to one of the advertised data communication rates may comprise an advertised data communication rate (e.g., the advertised beacon data communication rate) and a margin of error above and below the advertised data communication rate. For example, the margin of error may be ten percent of the advertised data communication rate, such that if the advertised data communication rate (e.g., the advertised beacon data communication rate) is 1 Mbps, the communication rate corresponding to the advertised communication rate may include any communication rate between and including 900 bps and 1.1 Mbps. For example, the margin of error may be greater than or less than ten percent.

For example, the response may be sent from the network device 104 to the user device 102 at a communication rate that is faster or slower than the faux advertised beacon data communication rate. The response (e.g., the third communication frame 203) may be sent based on the network device 104 receiving the request (e.g., the second communication frame 202) from the user device 102.

The third communication frame 203 may comprise a MAC header (e.g., an 802.11 MAC header), a body, and an FCS. The third communication frame 203 may comprise a timestamp, a beacon interval, network capability information, a network name (e.g., SSID), encryption capabilities of the network, supported communication rates (e.g., including the advertised data communication rate and faux advertised data communication rate for the network device 104), a frequency-hopping parameter set, a direct-sequence parameter set, a contention-free parameter set, an IBSS parameter set, capacity information, channel availability, and/or a traffic indication map. The network capability information may comprise the capabilities of the advertised network (e.g., the network 101) and/or the type (e.g., ad hoc, infrastructure, etc.) of the advertised network.

At 530, the computing device (e.g., the network device 104) may receive a second request (e.g., the authentication request). For example, the second request may comprise the fourth communication frame 204 (e.g., a management frame, such as the authentication request frame). The second request may be received from a second computing device (e.g., the user device 102). For example, the second request may be sent from the user device 102 to the network device 104 at a communication rate corresponding to a communication rate that satisfies (e.g., equals or matches) the faux advertised beacon data communication rate for the network device 104 and one of the supported communication rates (e.g., the requested data communication rate, such as the requested beacon data communication rate) of the user device 102. The second request (e.g., the fourth communication frame 204) may be received by the network device 104 based on the network device 104 sending the response (e.g., the probe response, and/or the third communication frame 203) to the user device 102.

The fourth communication frame 204 may comprise a MAC header, frame body, and FCS. The MAC header of the fourth communication frame 204 may comprise the source of the second request (e.g., an identifier of the user device 102, such as a user device ID, user device name, or MAC address of the user device 102) and a destination of the second request (e.g., an identifier of the network device 104, such as a network device ID, network device name, or MAC address of the network device 104). The body of the fourth communication frame 204 may comprise an authentication algorithm number (indicating if it is an open system or shared key network), a transaction number (indicating the number of transactions between the user device 102 and the network device 104), a status code (indicating success or failure of the authentication) and channel text (which may be used for shared key authentication). In a shared key authentication, the challenge text of the second request may also comprise a shared key or password. The second request may be sent from the user device 102 to the network device 104 at a communication rate corresponding to the common supported communication rate (e.g., the lowest common supported communication rate). For example, the lowest common supported communication rate for the network device 104 and the user device 102 may be the faux advertised data communication rate for the network device 104 and/or the requested data communication rate for the user device 102.

At 535, the computing device (e.g., the network device 104) may generate and/or send a second response (e.g., an authentication response). The second response may comprise the fifth communication frame 205 (e.g., a management frame, such as the second response frame or authentication response frame). For example, the second response may be sent from the network device 104 to the user device 102 at a communication rate corresponding to one of the supported communication rates (e.g., one of the advertised data communication rates, such as the slowest advertised data communication rate or another rate) for the network device 104 other than the faux advertised data communication rate. For example, the second response may not be sent by the network device 104 to the user device 102 at the faux advertised data communication rate) even though the faux advertised data communication rate may be included in the listing of supported communication rates for the network device 104 and may satisfy (e.g., equal) a supported communication rate (e.g., the requested data communication rate, such as the requested beacon data communication rate) of the user device 102.

For example, the second response may be sent from the network device 104 to the user device 102 at a communication rate corresponding to one of the advertised data communication rates, other than the faux advertised data communication rate, (e.g., one of the advertised beacon data communication rates) that does not satisfy (e.g., equal or match) one of the supported communication rates (e.g., the requested data communication rate, such as the requested beacon data communication rate) of the user device 102. For example, the communication rate corresponding to one of the advertised data communication rates may comprise an advertised data communication rate (e.g., the advertised beacon data communication rate) and a margin of error above and below the advertised data communication rate. For example, the margin of error may be ten percent of the advertised data communication rate, such that if the advertised data communication rate (e.g., the advertised beacon data communication rate) is 1 Mbps, the communication rate corresponding to the advertised communication rate may include any communication rate between and including 900 bps and 1.1 Mbps. For example, the margin of error may be greater than or less than ten percent.

For example, the second response may be sent from the network device 104 to the user device 102 at a communication rate that is faster or slower than the faux advertised data communication rate. The second response (e.g., the fifth communication frame 205) may be sent based on the network device 104 receiving the second request (e.g., the fourth communication frame 204) from the user device 102.

The fifth communication frame 205 may comprise a MAC header, frame body, and FCS. The MAC header of the fifth communication frame 205 may comprise a source of the second response (e.g., an identifier of the network device 104, such as a network device ID, network device name, or MAC address of the network device 104) and a destination of the second response (e.g., an identifier of the user device 102, such as a user device ID, user device name, or MAC address of the user device 102). The body of the fifth communication frame 205 may comprise an authentication algorithm number (indicating if it is an open system or shared key network), a transaction number (indicating the number of transactions between the user device 102 and the network device 104), and a status code (indicating success or failure of the authentication).

At 540, the computing device (e.g., the network device 104) may receive a third request (e.g., an association request). For example, the third request may comprise the sixth communication frame 206 (e.g., a management frame, such as the association request frame). The third request may be received from a second computing device (e.g., the user device 102). For example, the third request may be sent from the user device 102 to the network device 104 at a communication rate corresponding to the faux advertised data communication rate for the network device 104 and one of the supported communication rates (e.g., one of the requested data communication rates, such as the requested beacon data communication rate) of the user device 102. The third request (e.g., the sixth communication frame 206) may be received by the network device 104 based on the network device 104 sending the second response (e.g., the fifth communication frame 205) to the user device 102.

The sixth communication frame 206 may comprise a MAC header, frame body, and FCS. The MAC header of the sixth communication frame 206 may comprise the source of the third request (e.g., an identifier of the user device 102, such as a user device ID, user device name, or MAC address of the user device 102) and a destination of the third request (e.g., an identifier of the network device 104, such as a network device ID, network device name, or MAC address of the network device 104). The body of the sixth communication frame 206 may comprise network capability information for the user device 102 (e.g., the type of network that the user device 102 wants to join with), a listening interval (e.g., how often the user device 102 listens to first communication frames in order to monitor the traffic indication map), a network name (e.g., SSID) of the network to be joined (e.g., the network 101) and supported communication rates (e.g., the requested data communication rate, such as the requested beacon data communication rate) for the user device 102. The third request may be sent from the user device 102 to the network device 104 at a communication rate corresponding to the fastest supported communication rate for the user device 102 (e.g., the fastest requested data communication rate for the user device 102) and the faux advertised data communication rate for the network device 104).

At 545, the computing device (e.g., the network device 104) may generate and/or send a third response (e.g., an association response). The third response may comprise the seventh communication frame 207 (e.g., a management frame, such as the third response frame or association response frame). For example, the third response may be sent from the network device 104 to the user device 102. For example, the third response may be sent at a communication rate corresponding to one of the supported communication rates (e.g., one of the advertised data communication rates, such as the slowest advertised data communication rate or another rate) for the network device 104 other than the faux advertised data communication rate. For example, the third response may not be sent by the network device 104 to the user device 102 at the faux advertised data communication rate) even though the faux advertised data communication rate may be included in the listing of supported communication rates for the network device 104 and may satisfy (e.g., equal) a supported communication rate (e.g., the requested data communication rate, such as the requested beacon data communication rate) of the user device 102.

For example, the third response may be sent from the network device 104 to the user device 102 at a communication rate corresponding to one of the advertised data communication rates, other than the faux advertised data communication rate, (e.g., one of the advertised beacon data communication rates) that does not satisfy (e.g., equal or match) one of the supported communication rates (e.g., the requested data communication rate, such as the requested beacon data communication rate) of the user device 102. For example, the communication rate corresponding to one of the advertised data communication rates may comprise an advertised data communication rate (e.g., the advertised beacon data communication rate) and a margin of error above and below the advertised data communication rate. For example, the margin of error may be ten percent of the advertised data communication rate, such that if the advertised data communication rate (e.g., the advertised beacon data communication rate) is 1 Mbps, the communication rate corresponding to the advertised communication rate may include any communication rate between and including 900 bps and 1.1 Mbps. For example, the margin of error may be greater than or less than ten percent.

For example, the third response may be sent from the network device 104 to the user device 102 at a communication rate that is faster or slower than the faux advertised beacon data communication rate. The third response (e.g., the seventh communication frame 207) may be sent by the network device 104 based on the network device 104 receiving the third request (e.g., the sixth communication frame 206) from the user device 102.

The seventh communication frame 207 may comprise a MAC header, frame body, and FCS. The MAC header of the seventh communication frame 207 may comprise the source of the third response (e.g., an identifier of the network device 104, such as a network device ID, network device name, or MAC address of the network device 104) and a destination of the third response (e.g., an identifier of the user device 102, such as a user device ID, user device name, or MAC address of the user device 102). The body of the seventh communication frame 207 may comprise network capability information for the network device 102, a status code (indicating the success or failure of the user device's connection to the network), an association identifier (e.g., an identifier assigned by the network device 104 to the user device 102 and used by the network device 104 to monitor the connection status of the user device 102 to the network), and supported communication rates (e.g., the advertised data communication rates and the faux advertised data communication rate) for the network device 104.

At 550, a connection may be established and a communication session (e.g., the communication session 208) initiated between the computing device (e.g., the network device 104) and the second computing device (e.g., the user device 102). The communication session may be initiated in response to a success indication in the third response (e.g., the seventh communication frame 207). As part of the communication session 208, the user device 102 may send or otherwise transmit requests for content via the network device 104 to other devices and may receive content via the network device 104 from other devices communicating with the network (e.g., network 101). For example, the network device 104 may communicate with the user device 102 during the communication session at a communication rate faster than the supported communication rates (e.g., the requested data communication rate, such as the requested beacon data communication rate) of the user device 102. For example, the network device 104 may communicate with the user device 102 during the communication session at a communication rate faster than the faux advertised data communication rate (e.g., the faux advertised beacon data communication rate) of the network device 104. For example, the network device 104 may communicate with the user device 102 during the communication session at a communication rate that is faster than the communication rate that the third response was sent from the network device 104 to the user device 102. For example, the network device 104 may communicate with the user device 102 during the communication session at a communication rate that is slower than the faux advertised data communication rate.

Figure 6:
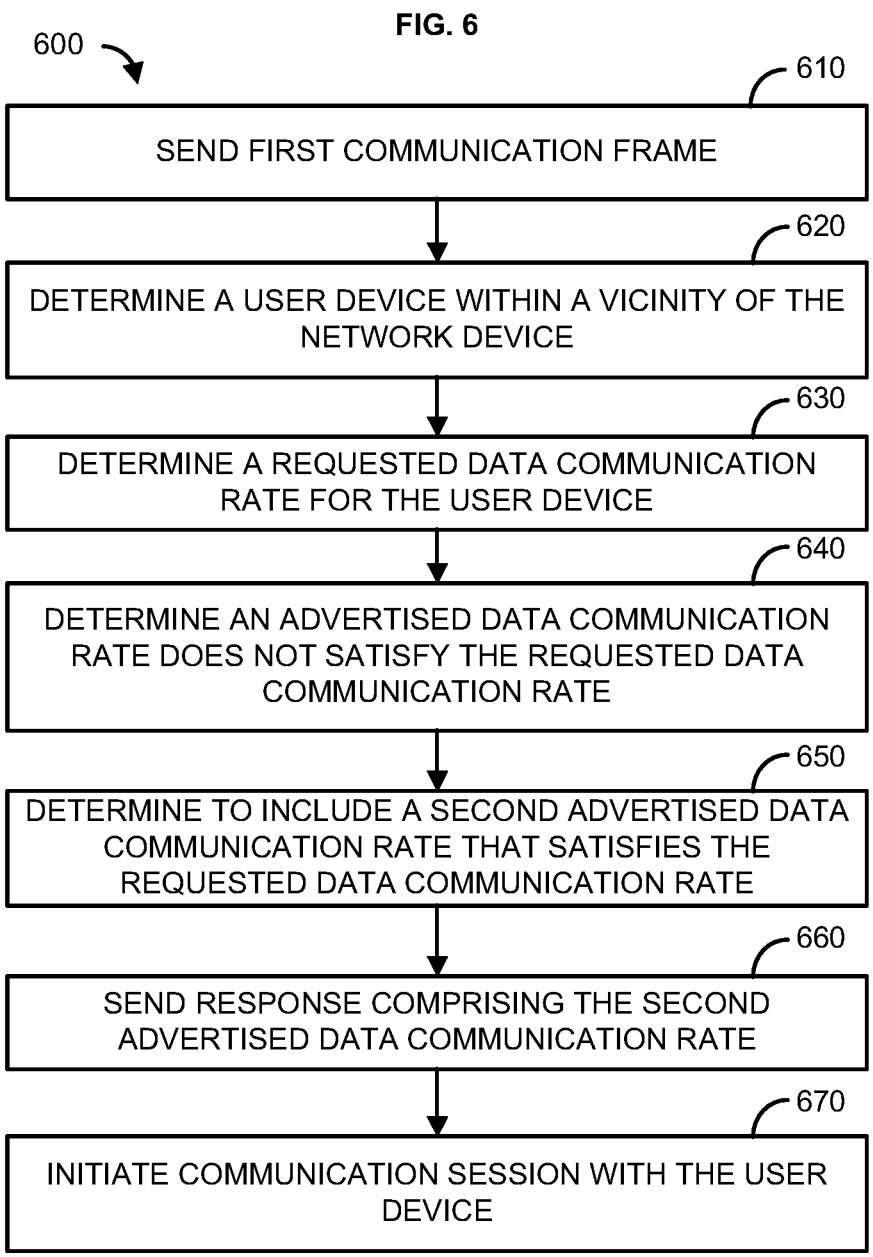
FIG. 6 shows a flowchart of another example method for managing a communication session.

FIG. 6 is a flowchart showing an example method 600 for managing a communication session. The management of the communication session may occur between a computing device (e.g., a network device 104) and a second computing device (e.g., a user device 102). The user device 102 may be at least one of a client device, a personal computer, computing station, workstation, portable computer, laptop computer, mobile phone, tablet device, smartphone, smartwatch, activity tracker, smart apparel, smart accessory, security and/or monitoring device, a mobile device, a game system, a content output device, or an IoT device. The network device 104 may be at least one of a wireless router, a gateway, an access point, or a node.

At 610, a computing device (e.g., the network device 104) may send or otherwise transmit a first communication frame (e.g., the first communication frame 201). For example, the first communication frame 201 may comprise a management frame, such as a beacon frame. The first communication frame 201 may be configured for communication using one or more communication protocols. For example, the communication protocol may be at least one of 802.11, 802.11a, 802.11b, 802.11g, 802.11n, 802.11ac, 802.11ax, Bluetooth, Zigbee, or Z-Wave. The first communication frame 201 may comprise information about the network (e.g., the network 101). The first communication frame 201 may be sent or otherwise transmitted periodically by the network device 104. For example, the first communication frame 201 may be sent at a preset time period or at a defined or adjustable interval. The first communication frame 201 may be configured to announce the presence of a network device (e.g., the network device 104) to other devices (e.g., the user device 102). The first communication frame 201 may also be configured to synchronize the members of the service set within the network (e.g., the network 101).

The first communication frame 201 may comprise a MAC header (e.g., an 802.11 MAC header), a body, and a FCS. The body of the first communication frame 201 may comprise a timestamp, a beacon interval, network capability information, a network name (e.g., a SSID), encryption capabilities of the network, supported communication rates (e.g., at least one advertised data communication rate, such as an advertised beacon data communication rate), a frequency-hopping parameter set, a direct-sequence parameter set, a contention-free parameter set, an IBSS parameter set, and/or a traffic indication map. The network capability information may comprise the capabilities of the advertised network (e.g., the network 101) and/or the type (e.g., ad hoc, infrastructure, etc.) of the advertised network.

At 620, the computing device (e.g., the network device 104) may determine a user device 102 within a vicinity (e.g., the communication range) of the network device 104. For example, the network device 104 may receive a ping or other communication from the user device 102 indicating to the network device 104 that the user device is within communication range of the network device 104.

At 630, the computing device (e.g., the network device 104) may determine a requested data communication rate (e.g., the requested beacon data communication rate) for the second computing device (e.g., user device 102). For example, the network device 104 may store in an array table or in another location in the database information about prior communication sessions with the user device 102. The information may comprise one or more supported communication rates (e.g., the requested data communication rate, such as the requested beacon data communication rate) for the user device 102 that were received by the network device 104 prior to initiating a prior communication session with the user device 102. For example, the requested data communication rate (e.g., the requested beacon data communication rate) may be a maximum data communication rate at which the user device 102 will initiate a communication session with a network device 104. However, once the communication session is initiated with the network device 104, the user device 102 may communicate with the network device 104 at a data communication rate that is greater than the requested data communication rate.

At 640, the computing device (e.g., the network device 104) may determine an advertised data communication rate (e.g., an advertised beacon data communication rate) for the network device 104 does not satisfy (e.g., equal) the requested data communication rate (e.g., the requested beacon data communication rate) of the user device 102. For example, the network device 104 may compare the one or more supported communication rates (e.g., the advertised data communication rate, such as the advertised beacon data communication rate) of the network device 104 to the one or more supported communication rates of the user device 102 (e.g., the requested data communication rate, such as the requested beacon data communication rate). The network device 104 may determine that none of the one or more supported communication rates for the network device 104 (e.g., the advertised data communication rate) satisfies (e.g., equals or matches) at least one of the one or more of the supported communication rates (e.g., the requested data communication rate, such as the requested beacon data communication rate) for the user device 102. For example, the advertised data communication rate (e.g., the advertised beacon data communication rate) may be a minimum data communication rate at which the network device 104 will initiate a communication session with a user device 102. For example, the advertised data communication rate may be a basic communication rate of the 802.11 protocol.

For example, the network device 104 may determine that the slowest supported communication rate for the network device 104 (e.g., the first advertised data communication rate) is faster than the fastest supported communication rate (e.g., the requested data communication rate) of the user device 102. For example, the stored information related to the supported communication rates for the user device 102 (e.g., the requested data communication rate) may list supported communication rates of 1 Mbps for the user device 102 and the network device 104 may have supported communication rates (e.g., advertised data communication rate) of 6 Mbps, 24 Mbps, and 48 Mbps. In this example, the slowest supported communication rate (e.g., the first advertised data communication rate) for the network device 104 of 6 Mbps is faster than the supported communication rate (e.g., the requested data communication rate) of 1 Mbps for the user device 102.

For example, the network device 104 may determine that the fastest supported communication rate for the network device 104 (e.g., the first advertised data communication rate) is slower than the slowest supported communication rate (e.g., the requested data communication rate) of the user device 102. For example, the stored information related to the supported communication rates for the user device 102 (e.g., the requested data communication rate) may list supported communication rates of 24 Mbps for the user device 102 and the network device 104 may have supported communication rates (e.g., advertised data communication rates) of 1 Mbps and 6 Mbps. In this example, the fastest supported communication rate (e.g., the first advertised data communication rate) for the network device 104 of 6 Mbps is slower than the supported communication rate (e.g., the requested data communication rate) of 24 Mbps for the user device 102.

At 650, the computing device (e.g., the network device 104) may adjust, add, or otherwise modify the supported communication rate (e.g., the advertised data communication rate, such as the advertised beacon data communication rate) for the network device 104 to satisfy (e.g., equal) one of the supported communication rates (e.g., the requested data communication rate, such as the requested data communication rate) for the user device 102. For example, the network device 104 may add a second advertised data communication rate to the supported communication rates for the network device 104 and/or modify or adjust a first advertised data communication rate to be the second data communication rate in the supported communication rates for the network device 104.

The network device 104 may adjust, add, or modify one of the supported communication rate for the network device 104 to be less than all of the original supported communication rates for the network device 104. For example, the network device 104 may adjust, add, or modify the supported communication rate (e.g., the second advertised data communication rate) to comprise the highest supported communication rate (e.g., the requested data communication rate, such as the requested beacon data communication rate) determined for the user device 102.

For example, the network device 104 may adjust, add, or modify the supported communication rate for the network device 104 to be greater than all of the original supported communication rates for the network device 104. For example, the network device 104 may adjust, add, or modify the supported communication rate (e.g., the second advertised beacon data communication rate) to comprise the slowest supported communication rate (e.g., the requested data communication rate, such as the requested beacon data communication rate) determined for the user device 102.

For example, the network device 104 may change communication protocols being used from a first communication protocol to a second communication protocol that is capable of communicating with the user device 102 at one or more of the supported communication rates (e.g., the requested data communication rate, such as the requested beacon data communication rate) of the user device 102. For example, the network device 104 may switch from the first communication protocol to the second communication protocol based on determining that the network device 104, using the first communication protocol, is not currently configured to communicate with other device (e.g., the user device 102) at the supported communication rate (e.g., the requested data communication rate, such as the requested beacon data communication rate) of the user device 102.

For example, the network device 104 may evaluate other communication protocols that are available (e.g., stored in the database 105 of the network device 104) to determine if any of the other available communication protocols support or configure the network device 104 to communicate (e.g., have a supported communication rate for the network device 104) that satisfies (e.g., equals) at least one supported communication rate (e.g., the requested data communication rate, such as the requested beacon data communication rate) of the user device 102. The network device 104 may select another communication protocol (e.g., the second communication protocol) for at least temporary communications by the network device 104 with the user device 102. For example, the first communication protocol and the second communication protocol may configure the network device 104 to communicate (e.g., have a supported communication rate) with at least one different communication rate. For example, the selection of the second communication protocol by the network device 104 may be based on the determination that the network device 104, communicating via the second communication protocol, allows for or configures the network device 104 to communicate with the user device 102 using a communication rate that corresponds to a communication rate that satisfies (e.g., equals) at least one supported communication rate (e.g., the requested data communication rate, such as the requested beacon data communication rate) of the user device 102. The network device 104 may conduct subsequent communications with the user device 102 and optionally other computing devices using the second communication protocol. For example, each of the first communication protocol and the second communication protocol may be a wireless communication protocol. For example, the first communication protocol may be at least one of 802.11, 802.11a, 802.11b, 802.11g, 802.11n, 802.11ac, 802.11ax, Bluetooth, Zigbee, or Z-Wave. For example, the second communication protocol may be at least one of 802.11, 802.11a, 802.11b, 802.11g, 802.11n, 802.11ac, 802.11ax, Bluetooth, Zigbee, or Z-Wave. For example, the first communication protocol may be at least one of 802.11ac or 802.11ax and the second communication protocol may be at least one of 802.11b, 802.11g, or 802.11n.

For example, the network device 104 may determine and/or create a faux advertised data communication rate (e.g., a faux advertised beacon data communication rate). For example, the faux advertised data communication rate for the network device 104 may be determined to satisfy (e.g., equal) one of the supported communication rates (e.g., the requested data communication rate, such as the requested beacon data communication rate) for the user device 102. For example, the faux advertised data communication rate for the network device 104 may be determined to satisfy (e.g., equal) the fastest supported communication rate (e.g., the requested data communication rate, such as the requested beacon data communication rate) for the user device 102. For example, the faux advertised data communication rate may be slower than all of the original supported communication rates for the network device 104. For example, the network device 104 may adjust, add, or modify the supported communication rate (e.g., advertised beacon data communication rate) for the network device 104 to comprise the faux advertised beacon data communication rate at a communication rate that satisfies (e.g., equals) the fastest supported communication rate (e.g., the requested data communication rate, such as the requested beacon data communication rate) for the user device 102.

For example, the faux advertised data communication rate may be faster than all of the original supported communication rates (e.g., advertised data communication rates) of the network device 104. For example, the network device 104 may adjust, add, or modify the supported communication rate (e.g., advertised data communication rate) for the network device 104 to comprise the faux advertised data communication rate at a communication rate that satisfies (e.g., equals) the slowest supported communication rate (e.g., the requested data communication rate, such as the requested beacon data communication rate) for the user device 102. For example, the faux advertised data communication rate may be a fake or false communication rate, in that the faux advertised data communication rate (e.g., the faux advertised beacon data communication rate) is not supported by the network device 104 as currently configured. For example, the network device 104 may not communicate with the user device 102 at the faux advertised data communication rate. For example, the network device 104 may include the faux advertised data communication rate in the list of supported communication rates for the network device 104 in an effort to initiate a communication session with the user device 102 that does not have a matching supported communication rate. The network device 104 may communicate with the user device 102 at a communication rate that is faster or slower than the faux advertised data communication rate.

At 660, the computing device (e.g., the network device 104) may generate and/or send a response (e.g., a probe response). For example, the response may comprise a third communication frame 203 (e.g., a management frame, such as a response frame or a probe response frame). For example, the response may be sent from the network device 104 to the user device 102 at a communication rate corresponding to one of the supported communication rates (e.g., the slowest advertised beacon data communication rate) for the network device 104.

For example, if the communication protocol was changed from the first communication protocol to the second communication protocol, the response may be sent at a communication rate corresponding to a supported communication rate for network device 104 using the second communication protocol. For example, if a faux advertised data communication rate has been created and included in the response as a supported communication rate, the response may not be sent to the user device 102 at the faux advertised data communication rate) even though the faux advertised beacon data communication rate may be included in the listing of supported communication rates for the network device 104 and may satisfy (e.g., equal) a supported communication rate (e.g., the requested data communication rate, such as the requested beacon data communication rate) of the user device 102. For example, the response may be sent from the network device 104 to the user device 102 at a communication rate corresponding to a faster or slower communication rate than the faux advertised data communication rate. The response (e.g., the third communication frame 203) may be sent based on the network device 104 determining that the user device 102 is within communication range of the network device 104.

The third communication frame 203 may comprise a MAC header (e.g., an 802.11 MAC header), a body, and an FCS. The third communication frame 203 may comprise a timestamp, a beacon interval, network capability information, a network name (e.g., SSID), encryption capabilities of the network, supported communication rates (e.g., including the advertised data communication rate, the second advertised data communication rate, and/or faux advertised data communication rate for the network device 104), a frequency-hopping parameter set, a direct-sequence parameter set, a contention-free parameter set, an IBSS parameter set, capacity information, channel availability, and/or a traffic indication map. The network capability information may comprise the capabilities of the advertised network (e.g., the network 101) and/or the type (e.g., ad hoc, infrastructure, etc.) of the advertised network.

The user device 102 and the network device 104 may conduct additional pre-communication session interactions with one another. These interactions may comprise the second request, second response, third request, and third response. Each of these interactions may occur in substantially the same manner as that described in FIGS. 3-5 herein.

At 670, a connection may be established and a communication session (e.g., the communication session 208) initiated between the computing device (e.g., the network device 104) and the second computing device (e.g., the user device 102). The communication session may be initiated in response to a success indication in the third response (e.g., the seventh communication frame 207). As part of the communication session 208, the user device 102 may send or otherwise transmit requests for content via the network device 104 to other devices and may receive content via the network device 104 from other devices communicating with the network (e.g., network 101). For example, the network device 104 may communicate with the user device 102 during the communication session at a communication rate corresponding to a communication rate that is faster than the supported communication rates (e.g., the requested data communication rate, such as the requested beacon data communication rate) of the user device 102. For example, the network device 104 may communicate with the user device 102 during the communication session at a communication rate corresponding to a communication that is faster than the faux advertised data communication rate of the network device 104. For example, the network device 104 may communicate with the user device 102 during the communication session at a communication rate corresponding to a communication rate that is faster than the second advertised data communication rate for the network device 104.

Figure 7:
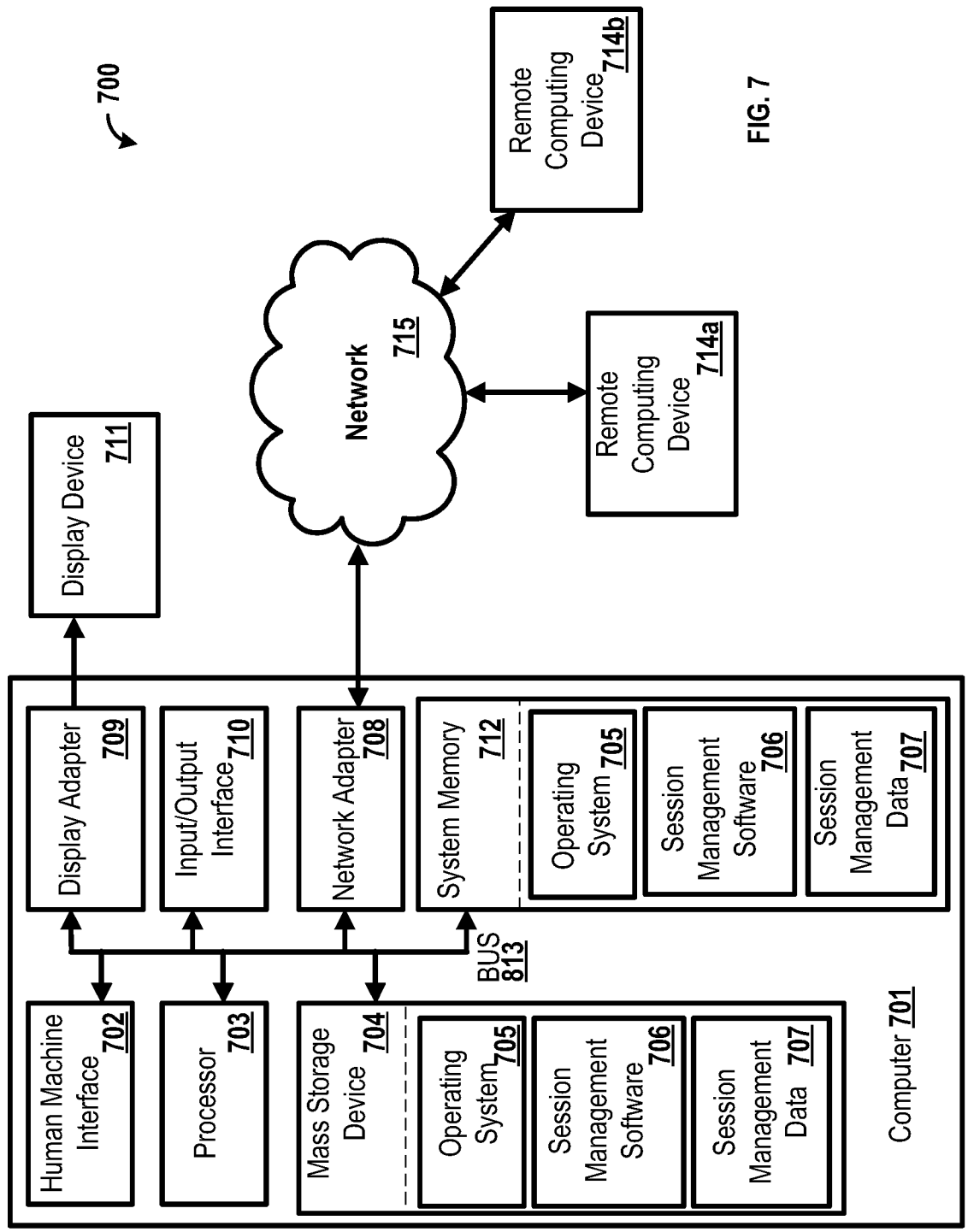
FIG. 7 shows a block diagram of an example computing device for implementing management of a communication session.

FIG. 7 shows a system 700 for managing a communication session. The user device 102 and the network device 104 (FIG. 1) may be a computer 701 as shown in FIG. 7.

The computer 701 may comprise one or more processors 703, a system memory 712, and a bus 713 that couples various components of the computer 701 including the one or more processors 703 to the system memory 712. In the case of multiple processors 703, the computer 701 may utilize parallel computing.

The bus 713 may comprise one or more of several possible types of bus structures, such as a memory bus, memory controller, a peripheral bus, an accelerated graphics port, and a processor or local bus using any of a variety of bus architectures.

The computer 701 may operate on and/or comprise a variety of computer-readable media (e.g., non-transitory). Computer-readable media may be any available media that is accessible by the computer 701 and includes, non-transitory, volatile and/or non-volatile media, and removable and non-removable media. The system memory 712 has computer-readable media in the form of volatile memory, such as random access memory (RAM), and/or non-volatile memory, such as read-only memory (ROM). The system memory 712 may store data such as session management data 707 and/or program modules such as operating system 705 and session management software 706 that are accessible to and/or are operated on by the one or more processors 703.

The computer 701 may also comprise other removable/non-removable, volatile/non-volatile computer storage media. The mass storage device 704 may provide non-volatile storage of computer code, computer-readable instructions, data structures, program modules, and other data for the computer 701. The mass storage device 704 may be a hard disk, a removable magnetic disk, a removable optical disk, magnetic cassettes or other magnetic storage devices, flash memory cards, CD-ROM, digital versatile disks (DVD) or other optical storage, RAM, ROM, electrically erasable programmable read-only memory (EEPROM), and the like.

Any number of program modules may be stored on the mass storage device 704. An operating system 705 and session management software 706 may be stored on the mass storage device 704. One or more of the operating system 705 and session management software 706 (or some combination thereof) may comprise program modules and the session management software 706. Session management data 707 may also be stored on the mass storage device 704. Session management data 707 may be stored in any of one or more databases known in the art. The databases may be centralized or distributed across multiple locations within the network 715.

A user may enter commands and information into the computer 701 via an input device (not shown). Such input devices include, but are not limited to, a keyboard, pointing device (e.g., a computer mouse or remote control), a microphone, a joystick, a scanner, tactile input devices such as gloves, and other body coverings, a motion sensor, and the like These and other input devices may be connected to the one or more processors 703 via a human-machine interface 702 that is coupled to the bus 713, but may be connected by other interface and bus structures, such as a parallel port, game port, an IEEE 1394 Port (also known as a Firewire port), a serial port, network adapter 708, and/or a universal serial bus (USB).

A display device 711 may also be connected to the bus 713 via an interface, such as a display adapter 709. It is contemplated that the computer 701 may have more than one display adapter 709 and the computer 701 may have more than one display device 711. A display device 711 may be a monitor, an LCD (Liquid Crystal Display), a light-emitting diode (LED) display, a television, smart lens, smart glass, and/or a projector. In addition to the display device 711, other output peripheral devices may comprise components such as speakers (not shown) and a printer (not shown) which may be connected to the computer 701 via Input/Output Interface 710. Any step and/or result of the methods may be output (or caused to be output) in any form to an output device. Such output may be any form of visual representation, including, but not limited to, textual, graphical, animation, audio, tactile, and the like. The display 711 and computer 701 may be part of one device, or separate devices.

The computer 701 may operate in a networked environment using logical connections to one or more remote computing devices 714a,b. A remote computing device 714a,b may be user device, a client device, a personal computer, computing station, workstation, portable computer, laptop computer, mobile phone, tablet device, smartphone, smartwatch, activity tracker, smart apparel, smart accessory, security and/or monitoring device, a mobile device, a game system, a content output device, an IoT device, a server, a router, a network computer, a peer device, edge device or other common network nodes, and so on. Logical connections between the computer 701 and a remote computing device 714a,b may be made via a network 715, such as a local area network (LAN) and/or a general wide area network (WAN). Such network connections may be through a network adapter 708. A network adapter 708 may be implemented in both wired and wireless environments. Such networking environments are conventional and commonplace in dwellings, offices, enterprise-wide computer networks, intranets, and the Internet.

Application programs and other executable program components such as the operating system 705 are shown herein as discrete blocks, although it is recognized that such programs and components may reside at various times in different storage components of the computing device 701, and are executed by the one or more processors 703 of the computer 701. An implementation of session management software 706 may be stored on or sent across some form of computer-readable media. Any of the disclosed methods may be performed by processor-executable instructions embodied on computer-readable media.

While specific configurations have been described, it is not intended that the scope be limited to the particular configurations set forth, as the configurations herein are intended in all respects to be possible configurations rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

What is claimed is:

1. A method comprising:
receiving, by a network device and from a user device, a request to initiate a communication session, wherein the request indicates a requested beacon data communication rate associated with the user device;
determining, based on the request, that an advertised beacon data communication rate of the network device is different than the requested beacon data communication rate;
determining, based on the requested beacon data communication rate, to communicate with the user device at the requested beacon data communication rate associated with the user device; and
sending, from the network device, to the user device a response at a data communication rate associated with the requested beacon data communication rate.

2. The method of claim 1, wherein the requested beacon data communication rate comprises a maximum communication rate for initiating the communication session with the user device.

3. The method of claim 1, wherein the advertised beacon data communication rate comprises a minimum communication rate for initiating the communication session with the network device.

4. The method of claim 1, wherein the advertised beacon data communication rate is greater than the requested beacon data communication rate.

5. The method of claim 1, further comprising:
receiving, from the user device, an authentication request at the data communication rate associated with the requested beacon data communication rate; and
sending, from the network device, to the user device an authentication response at a second communication rate greater than the data communication rate associated with the requested beacon data communication rate.

6. The method of claim 5, further comprising:
initiating the communication session with the user device; and
sending, from the network device, to the user device data at a third communication rate greater than the second communication rate.

7. The method of claim 1, wherein the response comprises a second advertised beacon data communication rate, wherein the second advertised beacon data communication rate satisfies the requested beacon data communication rate.

8. The method of claim 1, further comprising sending a beacon frame comprising the advertised beacon data communication rate.

9. A method comprising:
receiving, by a computing device and from a user device, a request indicating a requested beacon data communication rate;
determining, based on the requested beacon data communication rate, that the computing device is unable to satisfy the requested beacon data communication rate via a first communication protocol;
determining, based on the inability to satisfy the requested beacon data communication rate via the first communication protocol, to communicate via a second communication protocol that supports the requested beacon data communication rate; and
sending a response indicating the requested beacon data communication rate.

10. The method of claim 9, wherein the second communication protocol is at least one of 802.11, 802.11a, 802.11b, 802.11g, or 802.11n.

11. The method of claim 9, wherein the response comprises the requested beacon data communication rate.

12. The method of claim 9, further comprising:
determining that a communication session with the user device has terminated; and
determining, based on determining that the communication session with the user device has terminated, to communicate via the first communication protocol.

13. The method of claim 9, wherein the second communication protocol has a lower minimum communication rate for initiating a connection with the computing device than the first communication protocol.

14. The method of claim 9, wherein the first communication protocol is at least one of 802.11ac or 802.11ax.

15. The method of claim 9, wherein the requested beacon data communication rate comprises a maximum communication rate for initiating a communication session with the user device.

16. A method comprising:
receiving, by a computing device, a request indicating a requested beacon data communication rate;
determining, based on the requested beacon data communication rate, that the computing device is unable to satisfy the requested beacon data communication rate with an advertised beacon data communication rate for the computing device;
determining, based on the inability to satisfy the requested beacon data communication rate with the advertised beacon data communication rate, a faux beacon data communication rate; and
sending a response indicating the advertised beacon data communication rate comprising the faux beacon data communication rate.

17. The method of claim 16, wherein the faux beacon data communication rate satisfies the requested beacon data communication rate.

18. The method of claim 16, wherein sending the response comprises sending the response at a communication rate greater than the faux beacon data communication rate.

19. The method of claim 16, wherein the faux beacon data communication rate is less than minimum communication rate for initiating a connection to the computing device.

20. The method of claim 16, wherein the requested beacon data communication rate comprises a maximum communication rate for initiating a communication session with a user device and wherein the advertised beacon data communication rate comprises a minimum communication rate for initiating the communication session with the computing device.

* * * * *